(12) United States Patent
Ying et al.

(10) Patent No.: US 12,298,425 B2
(45) Date of Patent: May 13, 2025

(54) SOUND SOURCE POSITIONING METHOD AND APPARATUS

(71) Applicant: HUAWEI TECHNOLOGIES CO., LTD., Guangdong (CN)

(72) Inventors: Dongwen Ying, Shenzhen (CN); Danni Kuang, Shenzhen (CN); Yanong He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 18/215,486

(22) Filed: Jun. 28, 2023

(65) Prior Publication Data

US 2023/0333205 A1  Oct. 19, 2023

Related U.S. Application Data

(63) Continuation of application No. PCT/CN2021/132081, filed on Nov. 22, 2021.

(30) Foreign Application Priority Data

Dec. 31, 2020  (CN) .......................... 202011637064.4

(51) Int. Cl.
*G01S 5/18* (2006.01)
*G10L 15/02* (2006.01)
(Continued)

(52) U.S. Cl.
CPC .............. *G01S 5/18* (2013.01); *G10L 15/02* (2013.01); *G10L 21/0216* (2013.01);
(Continued)

(58) Field of Classification Search
CPC ........ G01S 5/18; G01S 13/852; G01S 13/862; G10L 15/02; G10L 21/0216;
(Continued)

(56) References Cited

U.S. PATENT DOCUMENTS 7,415,117 B2 *  8/2008  Tashev ................... H04R 3/005
                                                                 704/226
10,939,202 B2 *  3/2021  Stoltze ................... H04R 1/406
(Continued)

FOREIGN PATENT DOCUMENTS

CN  109506568 A     3/2019
CN  110085258 A *   8/2019  ............. G01S 13/88
(Continued)

*Primary Examiner* — John A Tweel, Jr.
(74) *Attorney, Agent, or Firm* — WOMBLE BOND DICKINSON (US) LLP

(57) ABSTRACT

A sound source positioning method and apparatus, a computer-readable storage medium, and a sound pickup apparatus are provided, for accurately locating a sound source by using a microphone array and a radar. The method includes: obtaining first location information by using echo data of a radar (201), where the first location information includes a first angle of an object relative to the radar; obtaining an incident angle by using a voice signal captured by a microphone array (202), where the incident angle is an angle at which the voice signal is incident to the microphone array; and fusing the first angle and the incident angle to obtain second location information (205), where the second location information indicates a location of a sound source generating the voice signal.

20 Claims, 16 Drawing Sheets

(51) Int. Cl.
  *G10L 21/0216* (2013.01)
  *G10L 21/028* (2013.01)
  *H04R 1/40* (2006.01)
  *H04R 3/00* (2006.01)
  *G10L 21/0208* (2013.01)

(52) U.S. Cl.
  CPC ............ *G10L 21/028* (2013.01); *H04R 1/406* (2013.01); *H04R 3/005* (2013.01); *G10L 2021/02082* (2013.01); *G10L 2021/02166* (2013.01)

(58) Field of Classification Search
  CPC ......... G10L 21/028; G10L 2021/02082; G10L 2021/02166; H04R 1/406
  See application file for complete search history.

(56) References Cited

U.S. PATENT DOCUMENTS

| | | | |
|---|---|---|---|
| 11,446,550 B2 * | 9/2022 | DeCarlo | A63B 63/083 |
| 11,671,756 B2 * | 6/2023 | Tourbabin | G10L 15/28 |
| | | | 367/127 |
| 11,747,463 B2 * | 9/2023 | Nagpal | H04L 67/12 |
| | | | 342/59 |
| 2019/0265345 A1 | 8/2019 | Jungmaier et al. | |
| 2021/0383795 A1 * | 12/2021 | Li | G10L 21/02 |

FOREIGN PATENT DOCUMENTS

| | | | | |
|---|---|---|---|---|
| CN | 110716180 A | * | 1/2020 | ............... G01S 5/22 |
| CN | 112859000 A | | 5/2021 | |

\* cited by examiner

SOUND SOURCE POSITIONING METHOD AND APPARATUS

CROSS-REFERENCE TO RELATED APPLICATIONS

This application is a continuation of International Application No. PCT/CN2021/132081, filed on Nov. 22, 2021, which claims priority to Chinese Patent Application No. 202011637064.4, filed on Dec. 31, 2020. The disclosures of the aforementioned applications are hereby incorporated by reference in their entireties.

TECHNICAL FIELD

This application relates to the field of artificial intelligence, and in particular, to a sound source positioning method and apparatus.

BACKGROUND

Voice interaction is widely used in smart conferences and home products. A primary problem is to pick up a voice signal in a noisy environment to prevent ambient noise and indoor reverberation from interfering with a target voice signal. Beamforming based on a microphone array can accurately pick up a voice signal, and is widely used in various voice interaction products. It can effectively suppress ambient noise and suppress indoor reverberation without obviously damaging a voice. Beamforming relies on accurate estimation of an orientation of a sound source, especially for an adaptive beamforming technology, which is very sensitive to an orientation of a sound source. A location deviation of several degrees may lead to a sharp decline in sound pickup performance. Therefore, how to accurately locate the sound source has become an urgent problem to be resolved.

SUMMARY

This application provides a sound source positioning method and apparatus, for accurately locating a sound source by using a microphone array and a radar.

According to a first aspect, this application provides a sound source positioning method, including: obtaining first location information by using echo data of a radar, where the first location information includes a first angle of an object relative to the radar; obtaining an incident angle by using a voice signal captured by a microphone array, where the incident angle is an angle at which the voice signal is incident to the microphone array; and fusing the first angle and the incident angle to obtain second location information, where the second location information indicates a location of a sound source generating the voice signal.

Therefore, in this implementation of this application, the location of the sound source relative to the microphone array may be obtained based on a location of the object detected by the radar and the incident angle detected by the microphone array, so that a beam used to separate a voice of the sound source is controlled to be enabled based on the location. Therefore, voice data of the sound source is accurately extracted from data captured by the microphone array. In addition, Regardless of whether a sounding object is in a static or moving state, the location of the sound source can be accurately determined, and the voice data of the sound source can be extracted more accurately.

In one embodiment, the fusing the first angle and the incident angle may include: determining a first weight corresponding to the first angle and a second weight corresponding to the incident angle, where the first weight and a moving speed of the object relative to the radar are positively correlated, and the second weight and the moving speed of the object relative to the radar are negatively correlated; and performing weighted fusion on the first angle and the incident angle based on the first weight and the second weight to obtain a fused angle, where the second location information includes the fused angle.

Therefore, in this implementation of this application, when weighted fusion is performed on the first angle and the incident angle, the weight may be determined based on the moving speed of the object. Therefore, accuracy of the fused angle may be improved by using a plurality of cases in which the object moves.

In one embodiment, the method further includes: extracting, based on the second location information, the voice data of the sound source from the voice signal captured by the microphone array.

Therefore, after the sound source is located, the voice data of the sound source can be accurately extracted from the data captured by the microphone array based on the accurate location of the sound source.

In one embodiment, the extracting, based on the second location information, the voice data of the sound source from the voice signal captured by the microphone array includes: using the data captured by the microphone array as an input of a preset beam separation network, and outputting the voice data of the sound source.

Therefore, in this implementation of this application, the voice data of the sound source may be separated from the data captured by the microphone array by using the beam separation network, that is, the voice data in a direction corresponding to the sound source is extracted through beamforming. In this way, more accurate voice data of the sound source is obtained.

In one embodiment, the beam separation network includes a voice separation model for separating the voice data of the sound source and background data in the input data, and the method further includes: determining a moving speed of the sound source based on the echo data; and updating the voice separation model based on the moving speed to obtain the updated voice separation model.

Therefore, in this implementation of this application, the voice separation model may be adaptively updated based on the moving speed of the sound source, so that the voice separation model matches a moving status of the sound source, and can be adapted to a scenario in which the sound source moves quickly. In this way, the voice data of the sound source is separated from the data captured by the microphone array.

In one embodiment, the updating the voice separation model based on the moving speed includes: determining a parameter set of the voice separation model based on the moving speed, to obtain the updated voice separation model, where the parameter set is related to a change rate of a parameter of the voice separation model, and the moving speed and the change rate are positively correlated.

Therefore, in this implementation of this application, a slow parameter change may improve model stability and reduce model jitter. A fast change helps quickly adapt to an environment change. Therefore, the change rate of the model parameter may be selected based on the moving speed of the target, to affect the parameter set of the voice separation model, and obtain the updated voice separation model.

In one embodiment, the beam separation network further includes a dereverberation model, and the dereverberation model is used to filter out a reverberation signal in the input data; and the method further includes: updating, based on a distance between the object and the radar, the dereverberation model to obtain the updated dereverberation model.

Therefore, in this implementation of this application, reverberation of the data captured by the microphone array may be contacted by using the dereverberation model, so that the voice data of the sound source separated by the voice separation model is more accurate.

In one embodiment, the updating, based on a distance between the object and the radar, the dereverberation model includes: updating, based on the distance between the object and the radar, a delay parameter and a prediction order in the dereverberation model to obtain the updated dereverberation model, where the delay parameter indicates duration of the reverberation signal lagging behind the voice data of the sound source, the prediction order indicates duration of reverberation, and both the delay parameter and the prediction order are positively correlated with the distance.

Usually, a distance between the sound source and the microphone array significantly affects reverberation of a signal received by the microphone array. When the distance is long, the voice signal generated by the sound source is transmitted over a long distance and attenuates greatly, while indoor reverberation remains unchanged, and the reverberation interferes with the voice signal greatly and lasts for long time. When the distance is short, the voice signal generated by the sound source is transmitted over a short distance and attenuates slightly, and influence of the reverberation is weakened. Therefore, the parameter of the dereverberation model may be adjusted based on the distance between the sound source and the microphone array. When the distance is long, a degree of dereverberation is increased. When the distance is short, the degree of dereverberation is reduced, and excessive dereverberation is prevented from interfering with the voice signal. Even when the distance is very small, for example, less than a preset minimum value, dereverberation may be stopped to improve quality of the obtained voice data.

In one embodiment, the method further includes: if the voice data of the sound source does not meet a preset condition, removing a beam used to process the voice signal captured by the microphone array.

Therefore, in this implementation of this application, when the voice data of the sound source does not meet the preset condition, for example, the sound source is not a living object, or the location of the sound source changes, the beam used to process the voice signal captured by the microphone array is removed to avoid capturing meaningless data.

In one embodiment, the method further includes: extracting a feature from the voice data to obtain an acoustic feature of the sound source; recognizing, based on the acoustic feature, a first probability that the sound source is the living object; determining, based on the echo data of the radar, a second probability that the sound source is the living object; and fusing the first probability and the second probability to obtain a fusion result, where the fusion result indicates whether the sound source is the living object.

Therefore, in this implementation of this application, whether the sound source is the living object may be further detected, so that a user can clearly learn whether a type of the object that currently makes a sound is the living object, thereby improving user experience.

In one embodiment, the obtaining an incident angle by using a voice signal captured by a microphone array includes: if a plurality of second angles are obtained by using the voice signal captured by the microphone array, and the first angle and the plurality of second angles are in a same coordinate system, selecting, from the plurality of second angles as the incident angle, an angle that has a smallest difference between the angle and the first angle or an angle whose difference between the angle and the first angle falls within a first preset range.

Therefore, in this implementation of this application, the plurality of angles may be captured by the microphone array. In this case, an angle closest to the sound source may be selected as the incident angle based on the angle captured by the radar, thereby improving accuracy of the obtained incident angle.

In one embodiment, after the obtaining an incident angle by using a voice signal captured by a microphone array, the method further includes: if a plurality of third angles are obtained based on the data captured by the microphone array for another time, selecting, based on the moving speed of the object, an angle from the plurality of third angles, and using the angle as the new incident angle.

Therefore, in this implementation of this application, after the plurality of angles are obtained by using the microphone array, the new incident angle may be selected from the plurality of angles based on the moving speed of the object to adapt to a case in which the location of the sound source constantly changes.

In one embodiment, the selecting, based on the moving speed of the object, an angle from the plurality of third angles, and using the angle as the new incident angle includes: if the moving speed of the object is greater than a preset speed, screening out, from the plurality of third angles as the new incident angle, an angle whose difference between the angle and the first angle falls within a second preset range; or if the moving speed of the object is not greater than the preset speed, screening out, from the plurality of third angles, an angle whose difference between the angle and the first angle falls within a third preset range, and using the angle as the new incident angle, where the third preset range covers and is greater than the second preset range.

Therefore, in this implementation of this application, when the moving speed of the object is excessively high, a new angle may be selected from a far location as the incident angle. When the moving speed is low, a new angle may be selected from a close location as the incident angle. This adapts to a case in which the location of the object constantly changes, and a generalization capability is strong.

In one embodiment, the method further includes: if the first location information does not include the first angle, using the incident angle as an angle of the sound source relative to the microphone array.

Therefore, in this embodiment of this application, if the object does not move, an angle of the object relative to the radar may not be detected by the radar. In this case, the incident angle obtained by using the microphone array may be directly used as the angle of the sound source relative to the microphone array. Even if the object does not move, the sound source can also be accurately detected, and accuracy of location detection of the sound source is improved.

In one embodiment, before the obtaining an incident angle by using a voice signal captured by a microphone array, the method further includes: if it is determined, by using the echo data, that the object is in a moving state and the object does not make a sound, adjusting a sound source detection threshold of the microphone array for the object, where the microphone array is configured to capture a voice signal whose sound pressure is higher than the sound source detection threshold.

In this implementation of this application, if it is detected that the object moves but does not make a sound, the sound source detection threshold may be reduced, which is paying attention to whether the sound source makes a sound. This increases attention to the sound source, and whether the sound source makes a sound can be quickly detected.

In one embodiment, the first location information further includes a first relative distance between the object and the radar, and the method further includes: obtaining a second relative distance between the object and the microphone array by using the voice signal captured by the microphone array; and fusing the first relative distance and the second relative distance to obtain a fused distance, where the fused distance indicates a distance of the sound source relative to the microphone array, and the second location information further includes the fused distance.

In this implementation of this application, if the distance between the object and the microphone array is captured by the microphone array, the distance and the distance captured by the radar may be fused to obtain the distance of the sound source relative to the microphone array or the radar for ease of performing a subsequent operation, for example, updating the beam separation network. Accuracy of separating the voice data from the sound source is improved.

According to a second aspect, this application provides a sound source positioning apparatus, including:
  a radar positioning module 1401, configured to obtain first location information by using echo data of a radar, where the first location information includes a first angle of an object relative to the radar;
  a microphone array positioning module 1402, configured to obtain an incident angle by using a voice signal captured by a microphone array, where the incident angle is an angle at which the voice signal is incident to the microphone array; and
  a sound source positioning module 1403, configured to fuse the first angle and the incident angle to obtain second location information, where the second location information recognizes a location of a sound source generating the voice signal.

In one embodiment, the sound source positioning module 1403 is specifically configured to: determine a first weight corresponding to the first angle and a second weight corresponding to the incident angle, where the first weight and a moving speed of the object relative to the radar are positively correlated, and the second weight and the moving speed of the object relative to the radar are negatively correlated; and perform weighted fusion on the angle and the incident angle based on the first weight and the second weight to obtain a fused angle, where the second location information includes the fused angle.

In one embodiment, the apparatus further includes:
  a voice separation module 1404, configured to extract, based on the second location information, voice data of the sound source from the voice signal captured by the microphone array.

In one embodiment, the voice separation module 1404 is specifically configured to: use data captured by the microphone array as an input of a preset beam separation network, and output the voice data of the sound source.

In one embodiment, the beam separation network includes a voice separation model for separating the voice data of the sound source and background data in the input data, and the apparatus further includes:
  an update module 1405, configured to: determine a moving speed of the sound source based on the echo data; and update the voice separation model based on the moving speed to obtain the updated voice separation model.

In one embodiment, the update module 1405 is specifically configured to determine a parameter set of the voice separation model based on the moving speed, to obtain the updated voice separation model, where the parameter set is related to a change rate of a parameter of the voice separation model, and the moving speed and the change rate are positively correlated.

In one embodiment, the beam separation network further includes a dereverberation model, and the dereverberation model is used to filter out a reverberation signal in the input data.

The update module is further configured to update, based on a distance between the object and the radar, the dereverberation model to obtain the updated dereverberation model.

In one embodiment, the update module is specifically configured to update, based on the distance between the object and the radar, a delay parameter and a prediction order in the dereverberation model to obtain the updated dereverberation model, where the delay parameter indicates duration of the reverberation signal lagging behind the voice data of the sound source, the prediction order indicates duration of reverberation, and both the delay parameter and the prediction order are positively correlated with the distance.

In one embodiment, the voice separation module is further configured to: if the voice data of the sound source does not meet a preset condition, remove a beam used to process the data corresponding to the sound source in the data captured by the microphone array.

In one embodiment, the apparatus further includes a liveness detection unit configured to: extract a feature from the voice data to obtain an acoustic feature of the sound source; recognize, based on the acoustic feature, a first probability that the sound source is a living object; determine, based on the echo data of the radar, a second probability that the sound source is the living object; and fuse the first probability and the second probability to obtain a fusion result, where the fusion result indicates whether the sound source is the living object.

In one embodiment, the microphone array positioning module is specifically configured to: if a plurality of second angles are obtained by using the voice signal captured by the microphone array, and the first angle and the plurality of second angles are in a same coordinate system, select, from the plurality of second angles as the incident angle, an angle that has a smallest difference between the angle and the first angle or an angle whose difference between the angle and the first angle falls within a first preset range.

In one embodiment, the microphone array positioning module is specifically configured to: after obtaining the incident angle by using the voice signal captured by the microphone array, if a plurality of third angles are obtained based on the data captured by the microphone array for another time, select, based on the moving speed of the object, an angle from the plurality of third angles, and using the angle as the new incident angle.

In one embodiment, the microphone array positioning module is specifically configured to: if the moving speed of the object is greater than a preset speed, screen out, from the plurality of third angles, an angle whose difference between the angle and the first angle falls within a second preset range, and use the angle as the new incident angle; or if the moving speed of the object is not greater than the preset speed, screen out, from the plurality of third angles, an angle whose difference between the angle and the first angle falls within a third preset range, and use the angle as the new incident angle, where the third preset range covers and is greater than the second preset range.

In one embodiment, the sound source positioning module is further configured to: if the first location information does not include the first angle, use the incident angle as an angle of the sound source relative to the microphone array.

In one embodiment, the sound source positioning module is further configured to: before the incident angle is obtained by using the voice signal captured by the microphone array, if it is determined, by using the echo data, that the object is in a moving state, that is, the object moves, and the object does not make a sound, adjust a sound source detection threshold of the microphone array for the object, where the microphone array is configured to capture a voice signal whose sound pressure is higher than the sound source detection threshold.

In one embodiment, the first location information further includes a first relative distance between the object and the radar, and the sound source positioning module is further configured to: obtain a second relative distance between the object and the microphone array by using the voice signal captured by the microphone array; and fuse the first relative distance and the second relative distance to obtain a fused distance, where the fused distance indicates a distance of the sound source relative to the microphone array, and the second location information further includes the fused distance.

According to a third aspect, an embodiment of this application provides a sound source positioning apparatus. The sound source positioning apparatus has a function of implementing the sound source positioning method in the first aspect. The function may be implemented by hardware, or may be implemented by hardware executing corresponding software. The hardware or the software includes one or more modules corresponding to the function.

According to a fourth aspect, an embodiment of this application provides a sound source positioning apparatus, including a processor and a memory, where the processor and the memory are interconnected through a line, and the processor invokes program code in the memory to perform a processing-related function in the sound source positioning method according to any one of the first aspect. In one embodiment, the sound source positioning apparatus may be a chip.

According to a fifth aspect, an embodiment of this application provides a sound source positioning apparatus. The sound source positioning apparatus may also be referred to as a digital processing chip or a chip. The chip includes a processing unit and a communication interface. The processing unit obtains program instructions through the communication interface, and when the program instructions are executed by the processing unit, the processing unit is configured to perform a processing-related function in any one of the first aspect or the optional implementations of the first aspect.

According to a sixth aspect, an embodiment of this application provides a computer-readable storage medium including instructions. When the instructions are run on a computer, the computer is enabled to perform the method in any one of the first aspect or the optional implementations of the first aspect.

According to a seventh aspect, an embodiment of this application provides a computer program product including instructions. When the computer program product runs on a computer, the computer is enabled to perform the method in any one of the first aspect or the optional implementations of the first aspect.

According to an eighth aspect, this application provides a terminal. The terminal includes a radar and a processor, and the radar and the processor are connected. The processor may be configured to perform the method in any one of the first aspect or the optional implementations of the first aspect. The radar is configured to capture echo data.

According to a ninth aspect, this application provides a sound pickup apparatus. The sound pickup apparatus includes a radar, a microphone array, and a processor. The radar may be the radar mentioned in the foregoing first aspect, and the microphone array may be the microphone array mentioned in the foregoing first aspect. The processor may be configured to perform the method in any one of the first aspect or the optional implementations of the first aspect.

In one embodiment, the sound pickup apparatus may include a device such as an octopus conference device, an Internet of things (IoT) device, or an intelligent robot.

DESCRIPTION OF EMBODIMENTS

The following describes technical solutions in embodiments of this application with reference to accompanying drawings in embodiments of this application. It is clear that the described embodiments are merely a part rather than all of embodiments of this application. All other embodiments obtained by a person of ordinary skill in the art based on embodiments of this application without creative efforts shall fall within the protection scope of this application.

A sound source positioning method provided in this application may be performed by a sound pickup device, and is applied to various scenarios in which sound pickup needs to be performed, for example, a video call, a voice call, a multi-party conference, audio recording, or video recording.

A sound source positioning apparatus provided in this application is described. The sound source positioning apparatus may include a plurality of terminals that can perform sound pickup. The terminal may include a smart mobile phone, a television, a tablet computer, a wristband, a head-mounted display (HMD) device, an augmented reality (AR) device, a mixed reality (MR) device, a cellular phone, a smartphone, a personal digital assistant (PDA), a vehicle-mounted electronic device, a laptop computer, a personal computer (PC), a monitoring device, a robot, a vehicle-mounted terminal, a wearable device, a self-driving vehicle, or the like. Certainly, a specific form of the terminal is not limited in the following embodiments.

Figure 1A:
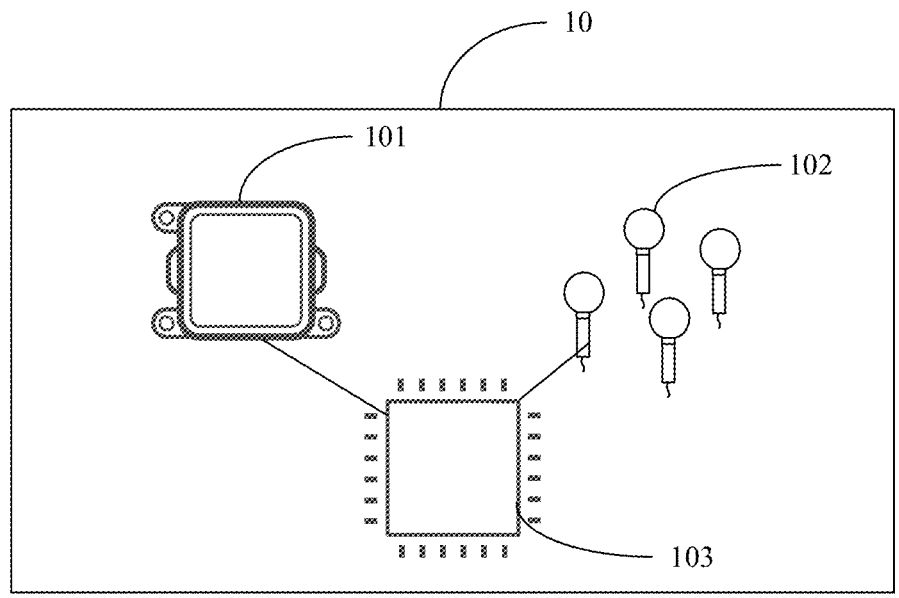
FIG. 1A is a schematic diagram of a structure of a sound source positioning apparatus according to this application.

For example, a structure of the sound source positioning apparatus (or may also be referred to as a sound pickup apparatus) may be shown in FIG. 1A. A sound source positioning apparatus 10 may include a radar 101, a microphone array 102, and a processor 103.

The radar 101 may include a laser radar or a millimeter wave radar of electromagnetic waves above 24 GHz, and the like. An antenna of the radar 101 may be a multiple-transmit multiple-receive antenna, or certainly may be a single antenna. In the following implementations of this application, the millimeter wave radar is used as an example for description, and the millimeter wave radar mentioned below in this application may alternatively be replaced with the laser radar. For example, the radar may be a millimeter wave radar whose operating frequency is 60 GHz, for example, a frequency-modulated continuous wave (FMCW) radar, or a single frequency continuous wave radar.

Figure 1B:
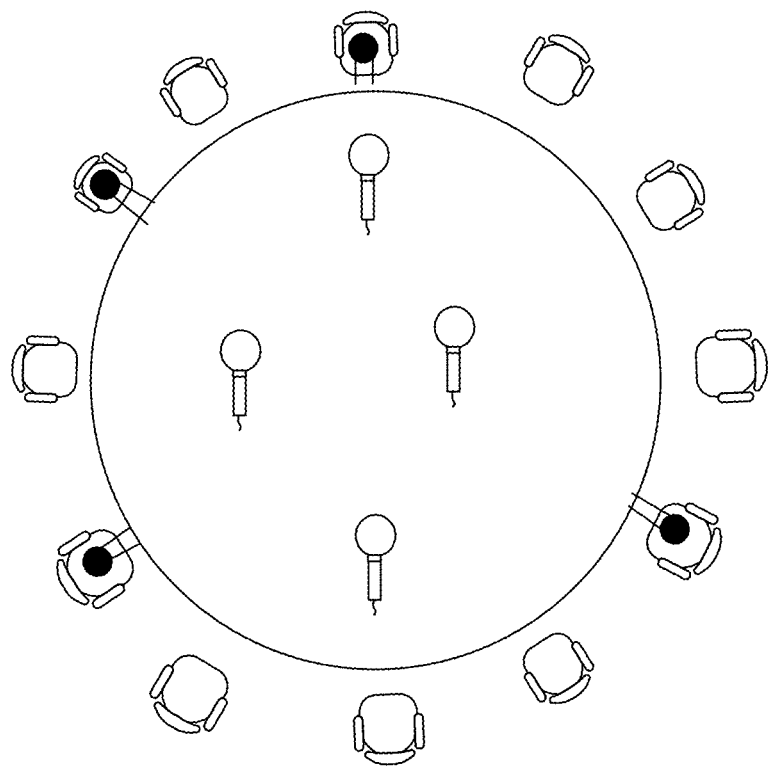
FIG. 1B is a schematic diagram of an application scenario according to this application.

The microphone array 102 may be an array including a plurality of microphones, and is configured to capture a voice signal. A structure including the plurality of microphones may include a centralized array structure, or may include a distributed array structure. For example, when voice sound pressure generated by a user exceeds a sound source detection threshold, the voice signal is captured by the microphone array. Each microphone may form one voice signal, and a plurality of voice signals are fused to form data captured in a current environment. For example, the centralized array structure is shown in FIG. 1B. The plurality of microphones are arranged to form a structure of a specific geometric shape based on a specific distance. For example, a distance between every two microphones is 10 cm to form a circular array. For example, the distributed array structure is shown in FIG. 1B. The microphones may be disposed in a plurality of different locations on a conference table.

The processor 103 may be configured to process echo data of the radar or data captured by the microphone array, to extract voice data corresponding to a sound source. It may be understood that the processor 103 may perform steps of the sound source positioning method provided in this application.

In one embodiment, the sound source positioning apparatus may include a device such as an octopus conference device, an Internet of things (IoT) device, or an intelligent robot.

Figure 1C:
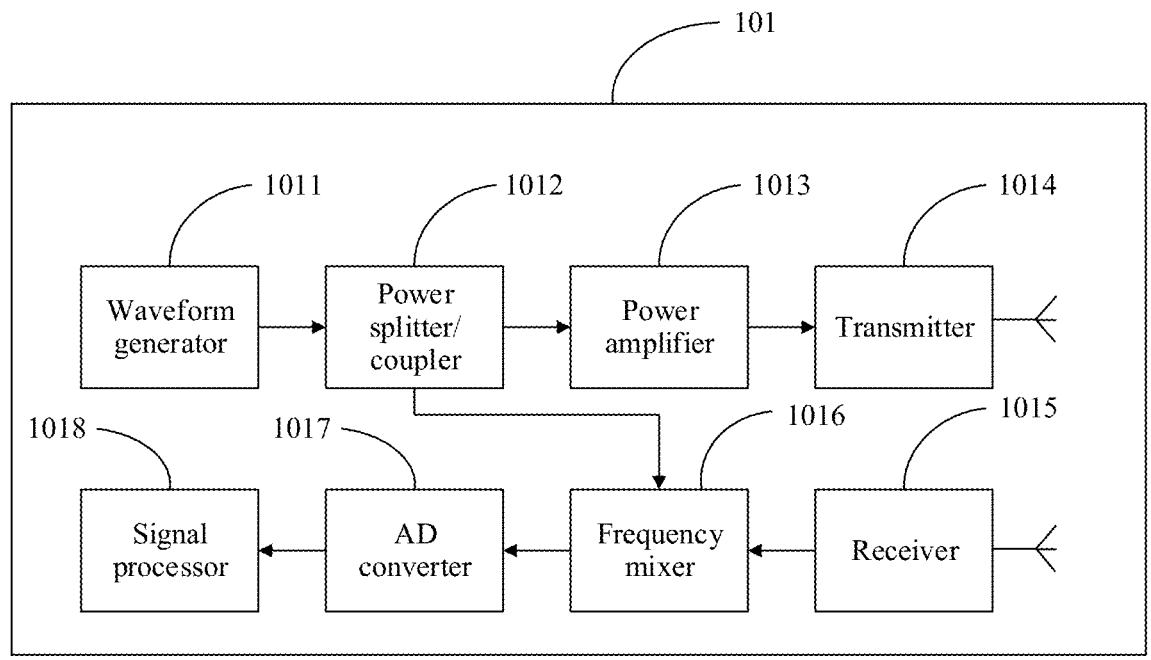
FIG. 1C is a schematic diagram of a structure of a radar according to this application.

For example, a structure of the radar 101 may be shown in FIG. 1C. The radar may specifically include modules such as a transmitter 1014, a receiver 1015, a power amplifier 1013, a power splitter/coupler 1012, a frequency mixer 1016, a waveform generator 1011, an analog-to-digital (AD) converter 1017, and a signal processor 1018.

The waveform generator 1011 generates a desired frequency-modulated signal. The power splitter/coupler 1012 divides the frequency-modulated signal into two signals. After the power amplifier 1013 amplifies one signal, a transmit signal is generated by using the transmitter 1014, and is radiated through a transmit antenna. An intermediate frequency signal is generated in the frequency mixer 1016 based on the other signal serving as a local oscillation signal and an echo signal received by the receiver 1015 through a receive antenna. Then, the AD converter 1017 converts the intermediate frequency signal into a digital signal. A main objective of the signal processor 1018 is to extract frequency information from the intermediate frequency signal, and obtain basic target information such as a distance and a speed through further processing for subsequent sound source positioning.

Specifically, the transmitter of the radar may continuously transmit modulated signals, and the modulated signals are received by the receiver of the radar after encountering a target object. When gesture is performed, a radar signal carrying a distance, an angle (or azimuth, pitch angle, or the like), Doppler information, micro-Doppler information, and the like of the gesture is captured, to form data of the current gesture for subsequent processing.

For example, the millimeter wave radar uses the FMCW radar. The radar has a variety of advantages such as simple hardware processing, easy to implement, a simple structure, a small size, light weight, low costs, and suitable for data collection and digital signal processing. Theoretically, there is no ranging blind area for the FMCW radar, and average power of a transmit signal is equal to peak power. Therefore, only a low-power device is required, and a probability of being intercepted and jammed is reduced.

The following uses an example to describe an application scenario of the sound source positioning apparatus provided in this application.

Figure 1D:
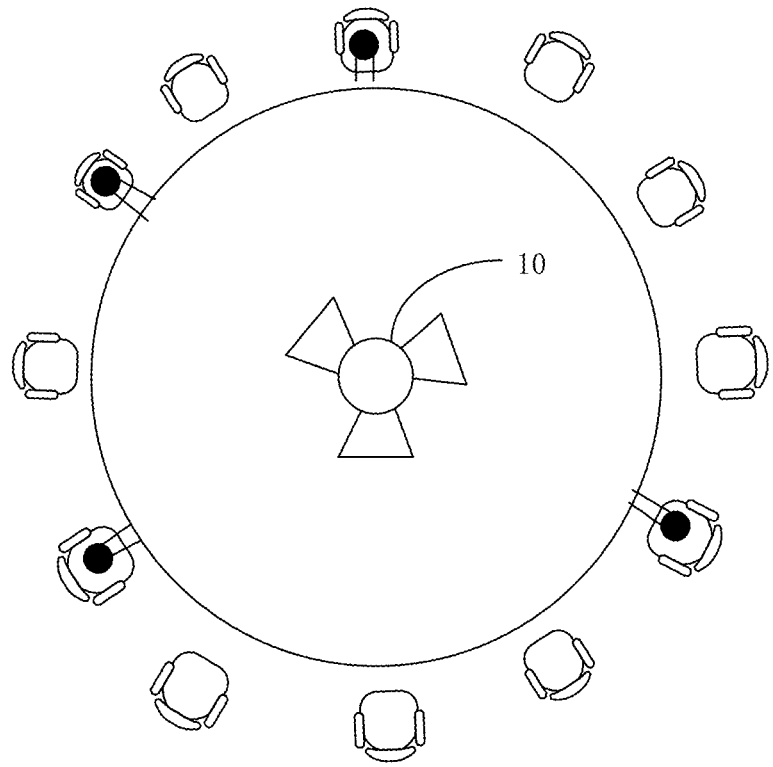
FIG. 1D is a schematic diagram of another application scenario according to this application.

For example, as shown in FIG. 1D, the sound source positioning apparatus 10 may be disposed on a conference table, a user may use the sound source positioning apparatus 10 to perform a video conference, and a speaking user may be tracked by using the sound source positioning apparatus 10, to extract a voice of the speaking user. In this way, a receiving end can accurately distinguish a speaking object.

Figure 1E:
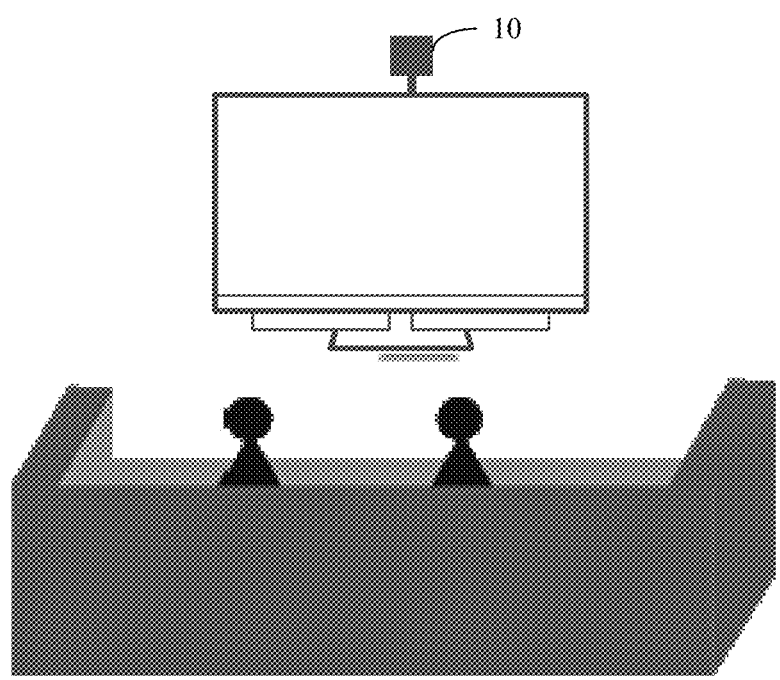
FIG. 1E is a schematic diagram of another application scenario according to this application.

For another example, as shown in FIG. 1E, in a smart television scenario, a user may control a display screen or another smart device by using the sound source positioning apparatus 10 disposed on the smart screen. A sound source can be accurately tracked by using the sound source positioning apparatus, to accurately extract voice data of the user.

Usually, beamforming based on a microphone array can accurately pick up a voice signal, and is widely used in various voice interaction scenarios. It can effectively suppress ambient noise and suppress indoor reverberation without obviously damaging a voice. Beamforming relies on accurate estimation of a location of a sound source, especially for adaptive beamforming, which is very sensitive to a sound source and positioning of the sound source. A location deviation of several degrees may lead to a sharp decline in sound pickup performance. In addition, the microphone array can locate a single sound source, but cannot effectively locate a plurality of sound sources that overlap in time. Especially in a scenario in which the plurality of sound sources move, the microphone array almost cannot work normally. However, in a daily acoustic environment, sound sources frequently overlap and move, and a microphone array cannot effectively pick up sound. At the expense of limiting an interactive application range and sacrificing user experience, a "wake-up word" manner is used as a simplified single target source scenario. However, in some intelligent conference scenarios, when a plurality of participants initiate sessions to a conference system, it is difficult to simplify the sessions to a single source scenario, and the system cannot simultaneously pick up voices of the plurality of participants.

The radar can accurately locate and track a plurality of target sources in motion or micro motion, and this application introduces a positioning capability of the radar into sound pickup, to form a strong complementary relationship with a microphone array positioning technology. This improves accuracy and robustness of positioning and tracking in a multi-sound source scenario, and improves a sound pickup capability of the microphone array.

In one case, if the millimeter wave radar is used to locate a human body target orientation, and then the beamforming technology is used to drive a beam to point to the human body orientation, the microphone array does not participate in sound source detection and positioning. The radar detects a human body target and the beam is enabled. One object corresponds to one beam, and the microphone array picks up the voice signal. In this case, the location of the sound source is detected by completely relying on the radar. However, the radar cannot determine a location of a static human body, and may miss a static sound source. In a dense human body scenario, the radar detects excessive targets, and excessive beams are easily formed, which causes calculation overload of the sound source positioning apparatus.

Actually, the sound source is a target of interest to a device. Living voice detection, that is, distinguishing a voice of a speaker from a voice directly generated by a pronunciation organ, is of great significance to voice interaction. A current living voice detection technology relies on a single-modal voice, and can only meet a detection requirement of a short distance (for example, within 1 meter). It is difficult to distinguish a remote voice source in a noisy environment. It is easy to take a voice generated by the speaker as a voice generated by a living object, which causes misjudgment.

Therefore, this application provides the sound source positioning method. The radar and the microphone array are combined to accurately locate the sound source, precise beam control is performed on the sound source, the voice data corresponding to the sound source is extracted, and the voice generated by the living object is further extracted. The following describes in detail the method provided in this application.

Figure 2:
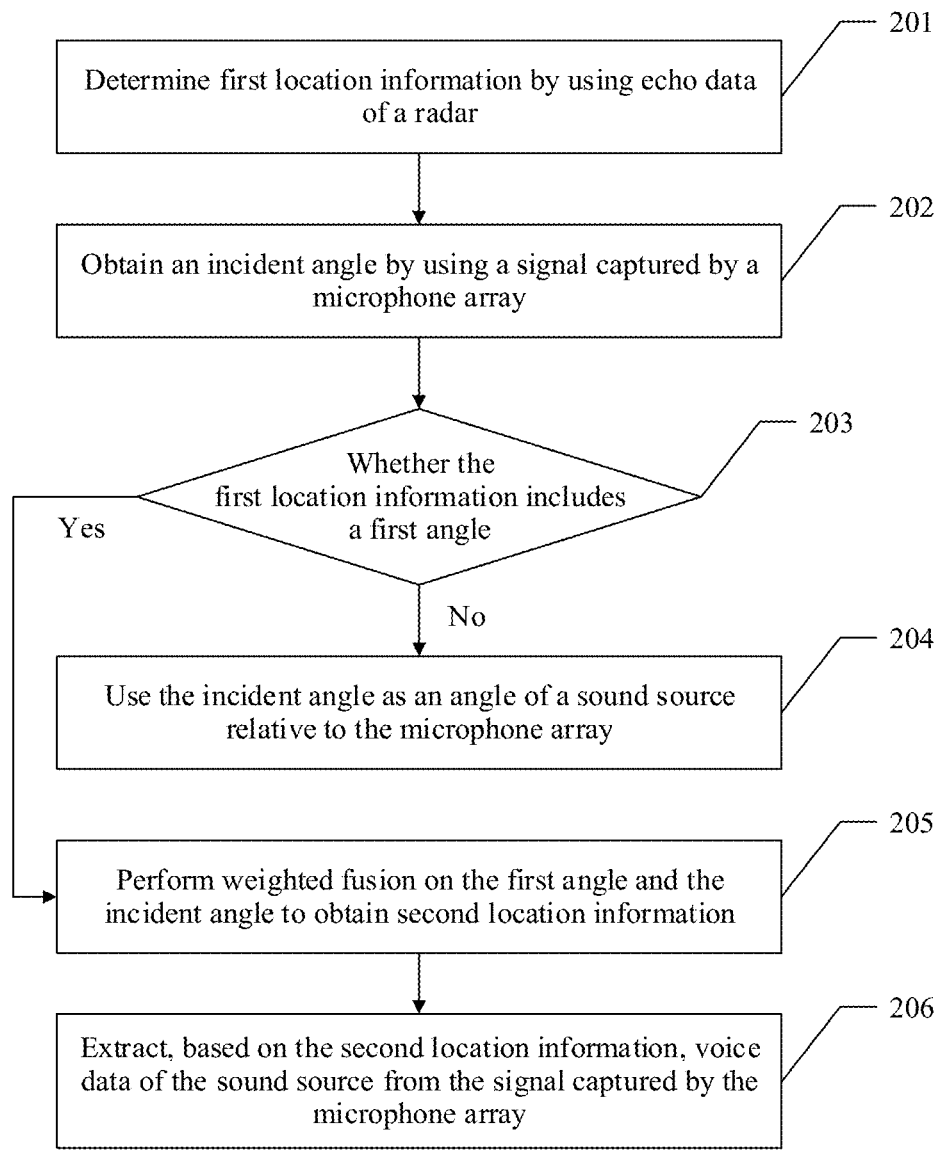
FIG. 2 is a schematic flowchart of a sound source positioning method according to this application.

FIG. 2 is a schematic flowchart of a sound source positioning method according to this application. Details are as follows.

201: Determine first location information by using echo data of a radar.

The first location information may include information such as a distance, an angle, or a speed of an object relative to the radar.

Specifically, the radar may transmit a modulated wave to a radiation range, the modulated wave is received by the radar after being reflected by the object, and an echo signal is formed, so that the echo data is obtained. The echo data includes information generated when one or more detected objects move within a detection range of the radar, for example, information about a track generated when a user moves within the radiation range.

More specifically, when a sound source falls within the radiation range of the radar, the echo data may include one or more of a speed, a distance, and an angle of the sound source relative to the radar; moving amplitude of the sound source; a moving period of the sound source; a frequency shift of a radar echo relative to a transmit signal; a phase of the radar echo relative to the transmit signal; or a moving acceleration of the sound source. The angle may include a pitch angle or an azimuth.

For example, radar positioning information may include the distance or the angle of the object relative to the radar. Distance information is included in frequencies of echo pulses, and fast Fourier transform may be performed on a single pulse to obtain distance information of the object within current pulse time. The distance information of the pulses is integrated to obtain overall distance change information of the object. The angle may include the azimuth and the pitch angle, and the angle is obtained based on a multiple-receive antenna and by measuring phase differences of received echoes. There may be a specific angle between the echo signal and the receive antenna due to a location of a reflection object. The angle may be calculated, so that a specific location of the reflection object may be learned, and a location change status of the object may be learned. The angle may be calculated in a plurality of manners. For example, a coordinate system centering on the radar is established, and a location of the object in the coordinate system is calculated based on the echo data, so that the pitch angle or the azimuth is obtained.

For example, when the sound source moves within the radiation range, information such as the speed of the sound source moving within the radiation range, the distance of the sound source relative to the radar, the moving amplitude of the sound source, or the angle of the sound source relative to the radar may be obtained based on an echo signal received by the radar within a period of time.

Figure 3:
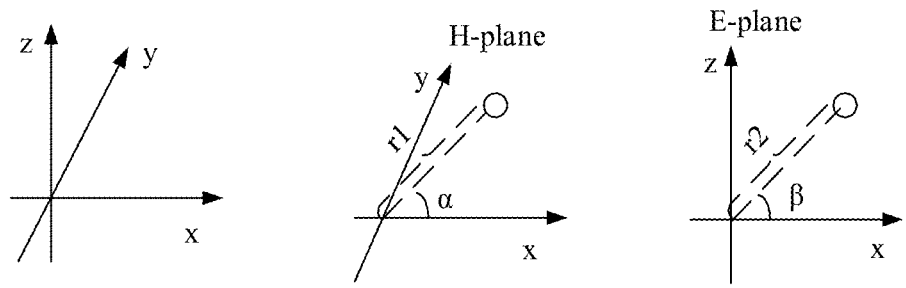
FIG. 3 is a schematic diagram of an angle according to this application.

For example, as shown in FIG. 3, a three-dimensional coordinate system may be established, where (x, y) corresponds to an H-plane and (y, z) corresponds to an E-plane. In the H-plane, a location of the radar is an origin, an x-axis is a polar axis, and coordinates of the object in the plane may be indicated as $(r_1, \alpha)$, where $\alpha$ indicates the azimuth. In the E-plane, a location of the radar may be an origin, a z-axis is a polar axis, and coordinates of the object may be indicated as $(r_2, \beta)$, where $\beta$ indicates the pitch angle.

In one embodiment, if location information of the object moving within the detection range of the radar is first determined by using the echo data, that is, the radar detects that the object is in motion, and the object does not make a sound, that is, an incident angle of the sound source is not detected, a sound source detection threshold of a microphone array for the object is adjusted. For example, the sound source detection threshold is reduced, to improve sensitivity of capturing a voice signal by the microphone array. The microphone array is configured to capture a signal whose sound pressure is higher than the sound source detection threshold.

Generally, the microphone array may capture a voice signal whose sound pressure exceeds a specific threshold. For example, the sound pressure of the voice exceeds the threshold. The threshold is collectively referred to as the sound source detection threshold below, and a voice signal that does not exceed the threshold is usually discarded. When the echo data of the radar is used to determine that there is a moving object within the radiation range, the sound source detection threshold of the microphone array may be controlled, to improve sound pickup sensitivity for the moving object. Generally, a higher sound source detection threshold indicates lower sound pickup sensitivity, and a lower sound source detection threshold indicates higher sound pickup sensitivity. For example, a location area in which the radar detects the moving object may be used as a candidate location. When the microphone array picks up sound at the candidate location, a set sound source detection threshold is low, so that the microphone array can accurately pick up sound on the moving object. Specifically, for example, in an area in which the radar does not detect the moving object, the sound source detection threshold is set to $\mu 1$. When the moving object is detected by using the echo data of the radar in a direction, a sound source detection threshold used for sound pickup in the direction is set to $\mu 2$, where $\mu 2 < \mu 1$. Therefore, sensitivity of the microphone array to perform sound pickup in this direction is improved, and a case of missing detection of a sound source is reduced.

It may be understood that, in this embodiment, the candidate location of the sound source may be indicated by the radar for the microphone array, thereby reducing the sound source detection threshold, and improving detection sensitivity of the microphone array for a candidate area, to prevent missing detection of the sound source. This can further increase a detection threshold outside the candidate area, and reduce detection sensitivity, to prevent misdetection of the sound source.

202: Obtain the incident angle by using the voice signal captured by the microphone array.

The microphone array includes a plurality of microphones, used to convert a sound wave signal into a digital signal. Sound source detection and sound source positioning may be performed by using the signal obtained by using the microphone array to obtain the incident angle of the sound source relative to the microphone array.

Figure 4:
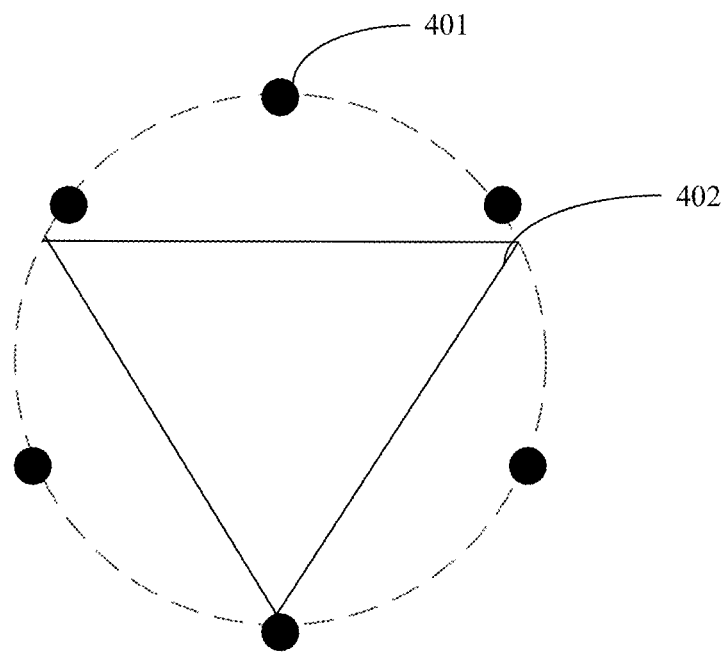
FIG. 4 is a schematic diagram of a structure of another sound source positioning apparatus according to this application.

In this implementation of this application, the following incident angle detected by the microphone array and an angle detected by the radar may usually be angles in a same coordinate system. For example, as shown in FIG. 4, a microphone array 401 may be an array formed by arranging a plurality of microphones, a center point of a radar 402 may coincide with a center point of the microphone array.

In addition, if the angle detected by the microphone array and the angle detected by the radar are not in the same coordinate system, the angle detected by the microphone array and the angle detected by the radar may be aligned, so that the angle detected by the microphone array and the angle detected by the radar are in the same coordinate system.

For example, if the microphone array is a distributed array, one microphone in the microphone array may be used as a reference microphone. After an incident angle of each microphone is obtained, the incident angle of each microphone is aligned and fused, and the incident angle obtained by each microphone is converted into an angle of the reference microphone. The incident angle of the reference microphone is then aligned with the angle detected by the radar, so that the incident angle of the reference microphone and the angle detected by the radar are in the same coordinate system.

Specifically, an incident direction may be indicated by using an azimuth or a pitch angle.

Figure 5:
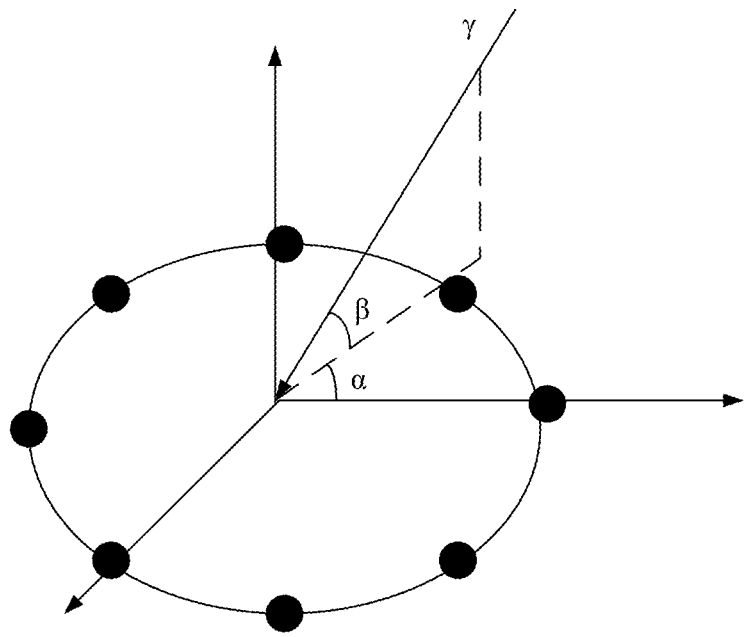
FIG. 5 is a schematic diagram of another angle according to this application.

For example, a planar array of a centralized microphone array is used as an example. As shown in FIG. 5, a three-dimensional coordinate system is established by using a center of the array as an origin of the coordinate system. A propagation direction of a sound signal generated by the sound source may be $\gamma$ shown in FIG. 5, where $\alpha$ indicates the azimuth, and $\beta$ indicates the pitch angle.

For ease of understanding, the following uses an example to describe, with reference to FIG. 5, a manner of obtaining the incident angle in this application.

At each moment, a continuous voice signal received by each microphone is split into a plurality of frames based on preset duration, and adjacent frames may overlap. For example, the voice signal received by the microphone may be split into frames of 32 ms, and an overlap length between two adjacent frames is 50%, to maintain continuity of frame signals. Fourier transform is performed on the frame signal, and a complex coefficient of Fourier transform is output, to determine directions in which there are sound sources.

Specifically, a hypothesis test may be used to determine the directions in which there are the sound sources. For example, the hypothesis test may be implemented in a grid search manner, and all possible incident directions are evenly divided into a plurality of discrete directions. For example, an azimuth [0°, 360°] interval is divided into 360 directions by an interval of 1 degree, an elevation interval [0, 90] may be divided into 30 intervals by 3 degrees, and all directions in space are indicated by 30×360.

At each grid point, a difference between propagation distances of sound waves to microphones is determined based on a hypothesis direction, where distances between the microphones are known. Any microphone in any microphone array is selected as the reference microphone, and other microphones are selected one by one as an assessed object.

Figure 6:
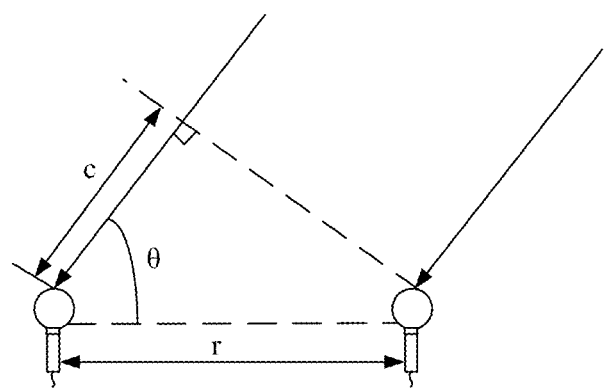
FIG. 6 is a schematic diagram of another angle according to this application.

A vector between the assessed microphone and the reference microphone is denoted as a space unit vector in the plane: $g_m = [g_{m,1}, g_{m,2}, 0]^T$. A direction corresponding to the grid point is marked as $\gamma = [\cos\alpha\cos\beta, \sin\alpha\cos\beta, \sin\beta]^T$, and a time difference of sound wave propagation between the assessed microphone and the reference microphone is $\tau_m = g_m^T \gamma r_m / c$, as shown in FIG. 6. A corresponding delay factor $e^{-j\omega\tau_m}$ is obtained on each frequency component $\omega$, and a frequency component of the sound source signal is multiplied, so that a signal of the assessed microphone is aligned with the reference microphone for time, thereby eliminating influence of a time difference. Usually, if the obtained grid point is close to or coincides with an actual incident direction, a similarity confidence level of signals between the microphones is highest after the time difference is eliminated.

Usually, a coherence coefficient may be introduced to measure a similarity between signals. After coherence coefficients between all assessed microphones and the reference microphone are obtained, the coherence coefficients between all the assessed microphones and the reference microphone are aggregated to obtain an overall signal similarity of the array. For example, overall similarity measure between the assessed microphone and the reference microphone may be indicated as $$f(\alpha, \beta) = \int_{nT}^{(n+1)T} \left| \sum_{m=1}^{M} w_m s_m(t - \tau_m(\alpha, \beta)) \right|^2,$$

where $w_m$ indicates a weight of an $m^{th}$ microphone signal, $s_m$ indicates a signal received by the microphone, and M indicates a total quantity of microphones.

Subsequently, several poles with a maximum coherence coefficient may be selected as candidate incident directions of the sound source. Usually, when an extremum corresponding to each candidate direction exceeds a preset value, the candidate direction may be used as the incident direction of the sound source.

Therefore, in this implementation of this application, the candidate direction of the sound source may be selected by using the coherence coefficient used to measure the similarity between the signals, and a direction that better matches the sound source may be selected based on the extremum, so that a location of the sound source can be more accurately determined.

In a possible scenario, a plurality of angles may be detected by the microphone array, and the plurality of angles correspond to one sound source. In this case, the plurality of angles need to be screened out to filter out an invalid angle. An angle before screening is referred to as a candidate angle, and an angle after screening is referred to as an incident angle.

A specific screening manner of the incident angle may include: if the moving object is detected by using the echo data of the radar, the obtained location information includes a first angle of the object relative to the radar. In this case, the plurality of incident angles may be separately compared with the first angle, and an angle with a minimum difference from the first angle or a difference within a first preset range may be selected as the incident angle.

Further, if a plurality of moving objects are determined by using the echo data of the radar, the plurality of angles are obtained, and the incident angle is obtained by using the microphone array, the plurality of angles and the incident angle may be compared, an angle with a minimum difference from the incident angle is used as the first angle, and weighted fusion is performed on the first angle and the incident angle to obtain an angle of the sound source. Alternatively, if the plurality of incident angles are determined by the microphone array, but only one object makes a sound, and the location of the moving object is determined by using the echo data of the radar, an angle that is in the plurality of incident angles and that is nearest to the object may be used as the incident angle.

In another possible scenario, a plurality of angles, that is, a plurality of third angles, may be obtained by using the microphone array, and one angle may be selected from the plurality of third angles based on a moving speed of the object, and used as the incident angle.

Specifically, if the moving speed of the object is greater than a first preset value, a third angle whose difference from the first angle falls within a second preset range is screened out from the plurality of third angles as a new incident angle. If the moving speed of the object is not greater than the first preset value, a third angle whose difference from the first angle falls within a third preset range is screened out from the plurality of third angles and used as the new incident angle. The third preset range covers and is greater than the second preset range.

For example, the second preset range may be a range greater than a first threshold, the second range may be a range greater than a second threshold, and the second threshold is less than the first threshold. Therefore, the third preset range covers and is greater than the second preset range. It is detected at a moment that the azimuth or the pitch angle of the user is the first angle, and in a subsequent period of time, the user is in a moving state, a sounding location of the user changes, and the plurality of incident angles are captured by the microphone. If a moving speed of the user is high, the sounding location of the user may change fast in this process. In this case, an angle whose angle between the user and the first angle falls within the second preset range may be selected as the new incident angle. If a moving speed of the user is low or close to static, the sounding location of the user may change slowly in this process, voice signals generated by the user at a plurality of locations may be detected by the microphone array, and the voice signals correspond to a plurality of different incident angles. In this case, an angle whose difference from the first angle falls within the third preset range may be selected as the new incident angle.

In one embodiment, if the distributed array is used as the microphone array, in addition to the incident angle of the voice signal, a distance between the object sending the voice signal and the microphone array may be further obtained. For example, the distances between the microphones in the microphone array are known, and a distance between the object and each microphone may be calculated based on a moment at which the voice signal arrives at the microphones and with reference to the distances between the microphones. Then, a distance between the object and the reference microphone is used as the distance between the object and the microphone array.

It should be noted that, an execution sequence of step 201 and step 202 is not limited in this application. Step 201 may be performed first, step 202 may be performed first, or step 201 and step 202 may be performed simultaneously. Specifically, the execution sequence may be adjusted based on an actual application scenario.

203: Determine whether the first location information includes the first angle; and if yes, perform step 205, or if no, perform step 204.

After the first location information is obtained, it may be determined whether the first location information includes the angle of the sound source relative to the radar. If the first location information includes the angle, fusion may be performed based on the first location information and the incident angle to obtain second location information of the sound source, that is, step 205 is performed. If the first location information does not include the angle of the sound source relative to the radar, the incident angle detected by the microphone array may be directly used as the angle of the sound source relative to the microphone array or the radar, that is, step 204 is performed.

Usually, a location of an object that has relative motion with the radar may be detected by the radar. When an angle of the object cannot be detected by using the echo data of the radar, it indicates that there is no relative motion between the sound source and the radar. In this case, the sounding object cannot be determined by using the echo data of the radar, and the location of the sound source may be determined with reference only to the incident angle.

In addition, this step for the case where the radar is a millimeter wave radar. Usually, the millimeter wave radar determines a spatial location of a human body based on Doppler effect generated by movement of the human body. This not only indicates a direction of the human body relative to the radar, but also indicates a distance from the human body to the millimeter wave radar. However, a static target cannot be detected. Therefore, when the millimeter wave radar is used for positioning, if there is no moving object within the radiation range, location information such as an angle and a speed of the static object may not be obtained by using the echo data. However, when the radar mentioned in this application is replaced with a laser radar, the object within the radiation range may be directly located, without determining whether the location information obtained through positioning includes the angle. In other words, step 203 does not need to be performed. Therefore, whether to perform step 203 may be determined with reference to an actual application scenario. Herein, performing step 203 is merely used as an example for description, and this is not intended as a limitation.

In an embodiment of this application, if the millimeter wave radar is used for positioning, that is, a sound source positioning apparatus implements sound source positioning in two modal positioning manners, that is, the sound source positioning is implemented by using radar positioning and microphone array positioning, the millimeter wave radar locates a dynamic object, and the microphone array locates an incident direction of the voice signal. Because of different principles of the two modal positioning manners, advantages and disadvantages of the two modal positioning manners are obviously different, there is a strong complementary relationship, and fusion can produce "1+1>2" effect. In this way, stable and accurate sound source direction estimation is implemented.

204: Use the incident angle as the angle of the sound source relative to the microphone array.

When the information detected by the radar does not include the incident angle of the sound source, that is, the echo data of the radar cannot be used to determine which object to be used as the sound source, the incident angle may be directly used as the angle of the sound source relative to the microphone array or the radar, thereby obtaining the location of the sound source.

For example, when a user speaks within the radar radiation range and does not move, the incident angle of the sound source may be captured by the microphone array, and the moving object cannot be determined from the echo data of the radar. To be specific, only a distance between the object and the radar within the radiation range can be detected by using the echo data of the radar, and a location of the sounding object cannot be determined. In this case, the incident angle of the microphone array may be directly used as the angle of the sound source relative to the microphone array or the radar, thereby determining a location of a sounding source.

In addition, if the distance of the object relative to the microphone array is further detected by using data captured by the microphone array, the distance may be directly used as the distance of the sound source relative to the microphone array, for subsequent beam separation.

205: Perform weighted fusion on the first angle and the incident angle to obtain the second location information.

If the first angle of the sound source relative to the radar is detected by using the echo data of the radar, weighted fusion may be performed on the first angle and the incident angle to obtain a fused angle, thereby obtaining location information of the sound source, that is, the second location information. The second location information includes the fused angle.

Specifically, a first weight corresponding to the first angle and a second weight corresponding to the incident angle may be separately determined. The first weight and a moving speed of the object relative to the radar are positively correlated, and the second weight and the moving speed of the object relative to the radar are negatively correlated. Weighted fusion is performed on the angle and the incident angle based on the first weight and the second weight to obtain the fused angle, where the second location information includes the fused angle. Usually, when the moving speed of the moving object exceeds a preset moving speed value, the weight of the first angle may be increased, and the weight of the incident angle may be reduced. When the speed of the moving object does not exceed the preset moving speed value, the weight of the first angle may be reduced, and the weight of the incident angle may be increased. This may be applied to sound sources in different statuses, and improve accuracy of sound source positioning. It may be understood that, usually, if the sound source moves at a high speed, the voice signal changes fast when incident to the microphone array, and the incident angle changes fast. It may not be possible to determine which angle is an angle matching the sound source. However, the radar can accurately locate the moving object. Therefore, the moving speed of the object is high, and the weight of the angle detected by the radar is high. As a result, the obtained fused angle can be more accurate. Therefore, in combination with radar positioning and microphone array positioning, the location of the sound source can be accurately located.

For example, the first angle may be indicated as $\theta_r$, and a corresponding weight value is $c_1$; the incident angle may be indicated as $\theta_m$, and a corresponding weight value is $c_2$; and the angle after fusion is indicated as $\theta_{fusion}=c_1\theta_r+c_2\theta_m$.

In addition to the fused angle, the second location information may further include the distance of the sound source relative to the radar or the microphone array, the moving speed of the sound source, the acceleration of the sound source, and the like. If the second location information further includes the information such as the distance, the moving speed of the sound source, and the acceleration of the sound source, the information such as the distance, the moving speed of the sound source, and the acceleration of the sound source may be obtained by using the echo data of the radar.

In addition, the distance of the object relative to the microphone array may be detected by using the data captured by the microphone array, and the distance captured by the microphone and the distance captured by the radar are fused to obtain the distance of the sound source relative to the microphone array, to facilitate subsequent beam separation. For example, a first relative distance and a second relative distance are fused to obtain a fused distance. The fused distance indicates the distance of the sound source relative to the microphone array, and the second location information further includes the fused distance. The first relative distance is a distance of the object relative to the radar, and the second relative distance is the distance of the object relative to the microphone array.

For example, the user also moves when sounding. In this case, location information of the moving user may be detected by using the echo data of the radar. The location information includes an angle of the object relative to the radar, such as an azimuth or a pitch angle. Weighted fusion may be performed on the angle of the object relative to the radar and an incident angle, to obtain the angle of the sound source relative to the radar or the microphone array. If the distance is captured by the microphone array, the distance may be fused with the distance captured by the radar, to obtain a location of the sound source relative to the microphone.

Usually, microphone array positioning can only obtain the incident angle of the sound source, and accuracy of sound source positioning is lower than that of radar positioning. Therefore, there is better effect for the radar to track the sound source. However, the radar is not sensitive to a static target, and may ignore a static sound source. In this case, it is necessary to rely on the microphone to perform sound source detection and sound source positioning, and determine the incident angle of the sounding target. Microphone array positioning information and radar positioning information are combined, the location of the sound source can be more accurately obtained, and continuous tracking and sound pickup of the target is implemented. Especially when the object moves at a low speed or is still, a high weight may be given to the incident angle, so that the fused angle is more accurate.

More specifically, there are a plurality of cases of sound source sounding: The sound source moves before sounding; the sound source moves after sounding; and the sound source moves when sounding. The following provides an example for description with reference to a specific scenario.

Figure 7A:
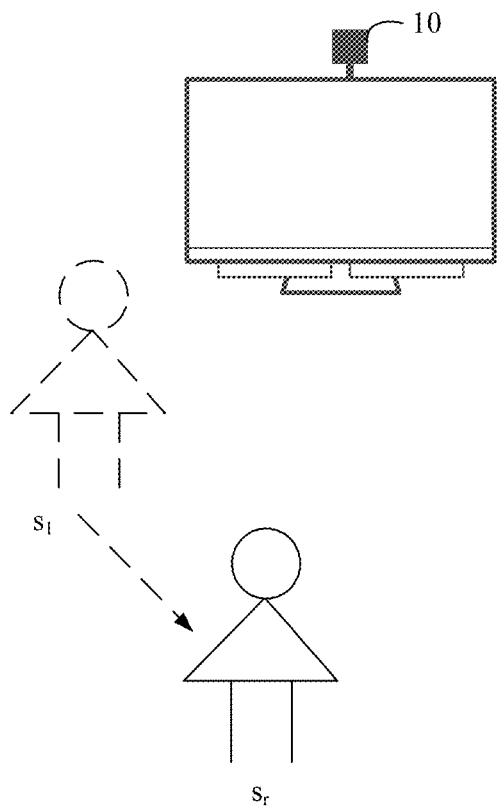
FIG. 7A is a schematic diagram of another application scenario according to this application.

When the sound source moves before sounding, as shown in FIG. 7A, the user moves from a location $S_1$ to a location $S_r$, the radar may first obtain the location information of the moving object, and an initial location of the sound source is set to a location of the object detected by the radar, indicated as a radar source $S_r(\theta_r)$. For example, the object may move within the radiation range of the radar, but not make a sound. The location detected by the radar may be used as the initial location of the sound source, the object is continuously tracked, and a location change of the object is tracked, so that it can be quickly and accurately detected subsequently whether the object makes a sound. In addition, in this scenario, another sound source detection threshold in which the object is located may be further reduced, to increase attention on a voice generated by the object.

Figure 7B:
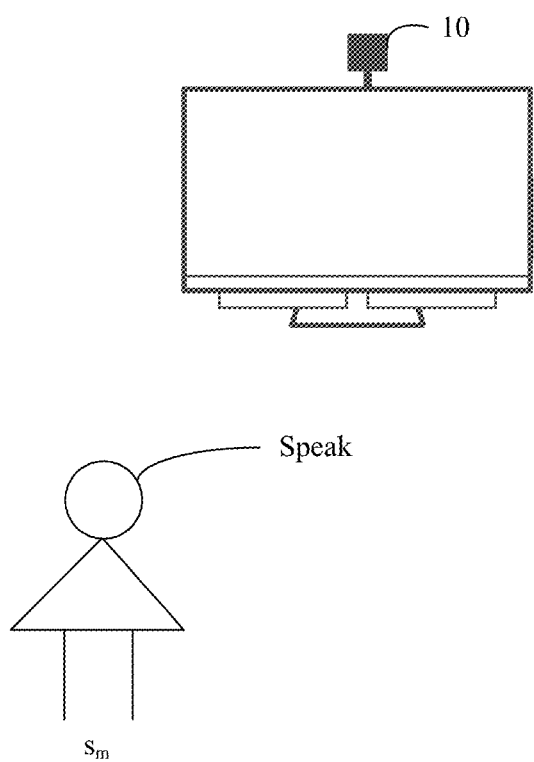
FIG. 7B is a schematic diagram of another application scenario according to this application.

When the sound source first makes a sound and then moves or does not move, as shown in FIG. 7B, it may be that the microphone array first obtains the incident angle of a sound generated by the sound source, and the sound source is initially set to the location of the object detected by the microphone array, indicated as a sounding source $CS_m(\theta_m)$. For example, the object may first make a sound, but not move within the radiation range of the radar. It cannot determine which object makes a sound by using the echo data of the radar. In this case, the location detected by the microphone array is used as the initial location of the sound source, so that when the object subsequently moves, a more accurate location of the object is obtained by using the echo data of the radar.

When the sound source starts to move when sounding, the radar source $S_r(\theta_r)$ may be used as the initial location of the sound source, or the sounding source $CS_m(\theta_m)$ may be used as the initial location of the sound source. This may be specifically determined based on an actual application scenario.

When locations of the object are fused, if the object is in the moving state, a high weight may be given to the angle obtained from the echo data of the radar; and if the object is in a static state, a high weight may be given to the incident angle detected by the microphone array. It may be understood that if the object is in the moving state, the location of the object may be detected more accurately by the radar. In this case, the weight of the first angle is increased, so that the finally obtained angle of the sound source is more accurate. When the object is in the static state, the sounding object may not be accurately recognized by using the echo data of the radar. In this case, the weight of the incident angle may be increased, so that the finally obtained angle of the sound source is more accurate.

206: Extract, based on the second location information, voice data of the sound source from the voice signal captured by the microphone array.

After the second location information is obtained, a specific location of the sound source may be learned, so that the voice data of the sound source may be extracted from the voice signal captured by the microphone array based on the second location information.

For example, after a direction of the sound source relative to the microphone array is learned, a beam in the direction may be enabled, to extract the voice data of the sound source.

In one embodiment, the voice data of the sound source may be output by using a beam separation network. For example, the data captured by the microphone array may be used as an input of the beam separation network, and the voice data of the sound source and background data are output. The background data is data other than the voice data of the sound source in the input data.

Therefore, in this implementation of this application, the location of the sound source relative to the microphone array may be obtained based on the location of the object detected by the radar and the incident angle detected by the microphone array, so that the beam used to separate a voice of the sound source is controlled to be enabled based on the location. Therefore, the voice data of the sound source is accurately extracted from the data captured by the microphone array. In addition, Regardless of whether the sounding object is in the static or moving state, the location of the sound source can be accurately determined, and the voice data of the sound source can be extracted more accurately.

The foregoing describes in detail the sound source positioning method provided in this application. The following describes in more detail the sound source positioning method provided in this application with reference to a more specific application scenario.

Figure 8:
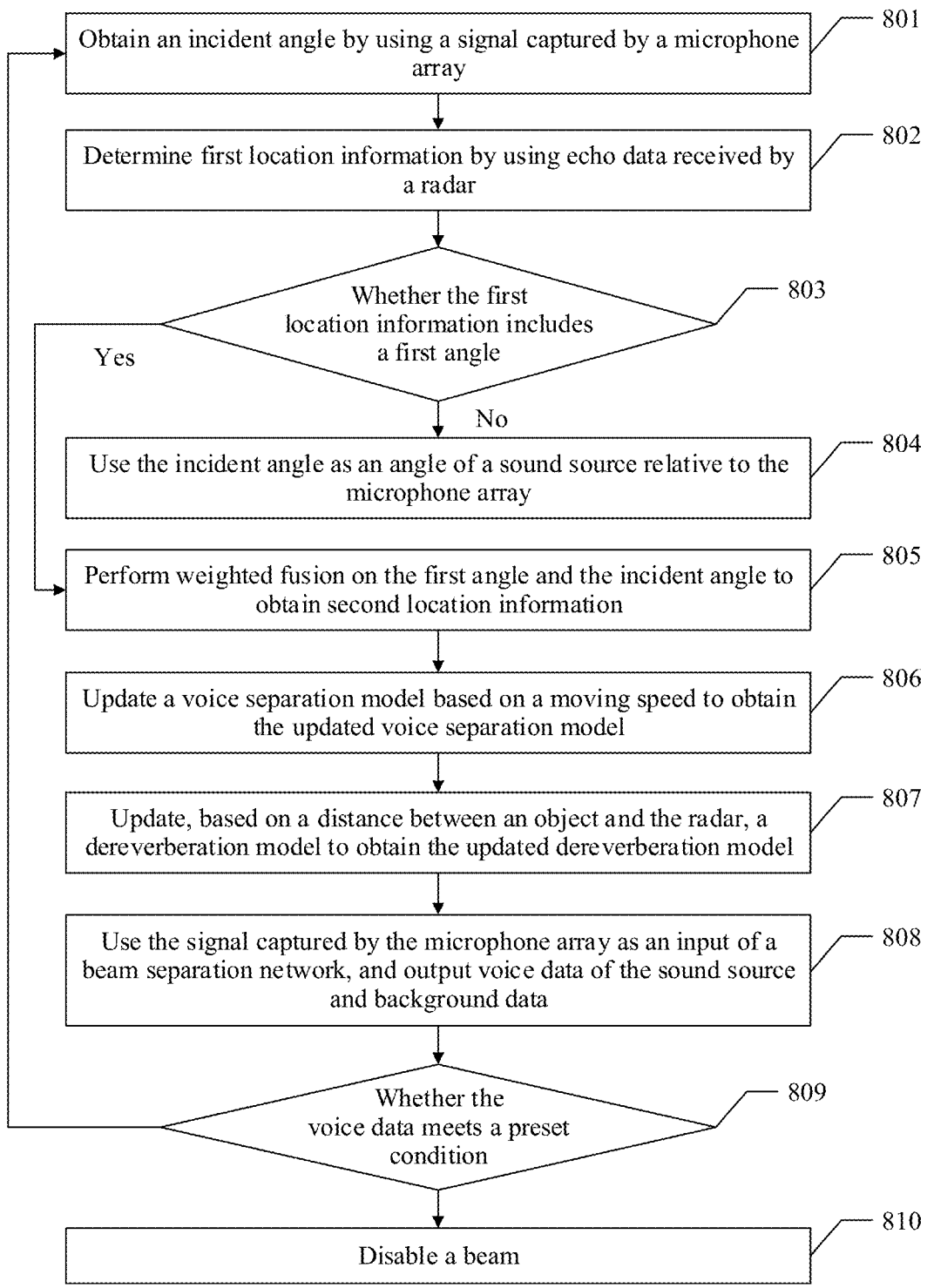
FIG. 8 is a schematic flowchart of another sound source positioning method according to this application.

FIG. 8 is a schematic flowchart of another sound source positioning method according to this application. Details are as follows.

801: Obtain an incident angle by using a voice signal captured by a microphone array.

802: Determine first location information by using echo data received by a radar.

803: Determine whether the first location information includes a first angle; and if no, perform step 804, or if yes, perform step 805.

804: Use the incident angle as an angle of a sound source relative to the microphone array.

805: Perform weighted fusion on the first angle and the incident angle to obtain second location information.

For steps 801 to 805, refer to related description in the foregoing steps 201 to 205. Similarities are not described herein again. This embodiment describes only different steps or more detailed application scenarios.

Scenario 1: The Sound Source is Detected for an Initial Time.

In one embodiment, in a scenario in which when an initial location of the sound source is a radar source $S_r(\theta_r)$, a plurality of cases may occur. An example in which location information of the sound source obtained by using the echo data of the radar includes an azimuth is used. Some scenarios are described, and the azimuth mentioned below may alternatively be replaced with a pitch angle in different scenarios.

1. If a moving object (indicated as a radar source $S_r(\theta_r)$) is determined to be within a radiation range by using the echo data of the radar, but the object does not make a sound, the microphone array cannot detect an exact incident angle of the object. However, the following cases may occur.

(1) The Object does not Make a Sound for a Long Time.

In this case, a location of the object can only be tracked by the radar. If there are a plurality of sound sources in this scenario, the object may be ignored to reduce load of a device. For example, if it is determined by using the echo data of the radar that a plurality of objects move and sound within the radiation range, a quantity of objects that sound exceeds a preset quantity. In this case, an object that continuously moves but does not make a sound may be ignored, thereby reducing the load of the device and reducing power consumption of the device.

(2) The Object Makes a Sound.

In this case, it may be understood that a sounding direction detected by the radar is close to a sounding direction detected by the microphone array, and an angle detected by the microphone may be used as the incident angle of the sound source. For example, if the incident angle is detected in a range of $S_r(\theta_r)\pm\theta_{thd0}$, the angle may be used as the incident angle matching a sounding object. If a plurality of angles are detected in the range of $S_r(\theta_r)\pm\theta^{thd0}$, an angle closest to the azimuth may be selected as the incident angle of the sound source.

Figure 9:
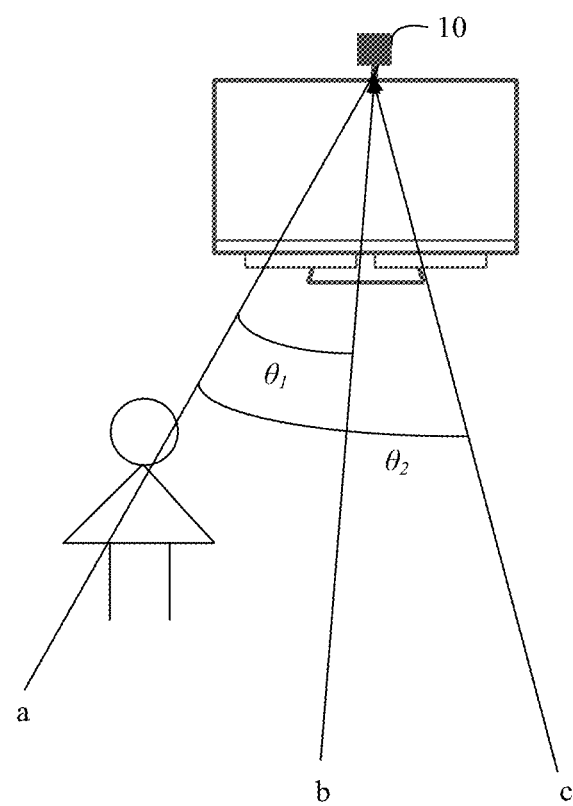
FIG. 9 is a schematic diagram of another application scenario according to this application.

As shown in FIG. 9, a direction of the object relative to a sound source positioning apparatus is a direction a, and two candidate angles b and c are detected. An angle difference between a and b is $\theta_1$, an angle difference between c and a is $\theta_2$, and $\theta_2 > \theta_1$. An angle corresponding to a candidate sound source b may be used as the incident angle; and a candidate sound source c may be discarded, or an angle corresponding to the sound source c may be used as an incident angle of a new sound source.

2. The object may first make a sound. Therefore, the microphone array first detects an incident angle of the voice signal. In this scenario, for example, the following plurality of cases may occur.

(1) The Object is Static.

In this case, a location of the sounding object cannot be detected by the radar, and a candidate sound source $CS_m(\theta_m)$ detected by the microphone array may be directly used as an actual sound source $S_m(\theta)$.

(2) The Object Moves.

In this case, the echo data of the radar may be used to detect a direction, angle, or distance of movement of the object, to obtain the radar source $S_r(\theta_r)$. The radar source $S_r(\theta_r)$ is associated with the sound source $S_m(\theta_m)$, to obtain the actual sound source. An angle of the actual sound source relative to the radar or the microphone array may be indicated as $\theta_{fusion}=c_1\theta_r+c_2\theta_m$, where $c_1$ and $c_2$ are weight values. $\theta_r$ is the first angle obtained by using the echo data of the radar, and may include the azimuth or the pitch angle.

$\theta_m$ is the incident angle of the voice signal relative to the microphone array, and may include the azimuth or the pitch angle.

Therefore, in this implementation of this application, based on the incident angle captured by the microphone array and the data captured by the radar, the sound source can be accurately located in various scenarios, and a generalization capability is strong. This improves accuracy of subsequently obtained voice data of the sound source.

Scenario 2: The Sound Source is Continuously Detected.

In a process of continuously tracking sounding of the sound source, the sound source may be in a moving state, and the microphone array may detect a plurality of signal incident angles due to a location change of the sound source. In this case, an angle matching the sound source needs to be selected from the plurality of incident angles as the incident angle, or an incident angle of a new sound source is screened out.

1. That an angle matching the sound source needs to be selected from the plurality of incident angles as the incident angle may include: If a difference between the plurality of incident angles and the azimuth falls within a range of $S_r(\theta_r)\pm\theta^{thd0}$, an incident angle closest to the azimuth may be selected as the incident angle of the sound source.

2. A manner of screening out the incident angle of the new sound source may include: screening the plurality of incident angles based on a moving speed of the object, and selecting the incident angle of the new sound source. For example, because the object makes a sound in a movement process, a plurality of candidate locations may be obtained by the microphone array, for example, indicated as $(CS_{m1}(\theta_{m1}), CS_{m2}(\theta_{m2}), \ldots, CS_{mk}(\theta_{mk}))$, which do not all fall within the range of $S_r(\theta_r)\pm\theta^{thd0}$. Candidate angles are screened based on the azimuth of the radar source $S_r(\theta_r)$, and the new incident angle is screened out.

A manner of screening the candidate angles may include:
when the speed of the object is less than a preset speed, screening out a candidate angle that is out of the range $\pm\theta_{thd1}$ (that is, a second preset range) of the radar source $S_r(\theta_r)$, to be used as the new incidence angle.

Figure 10A:
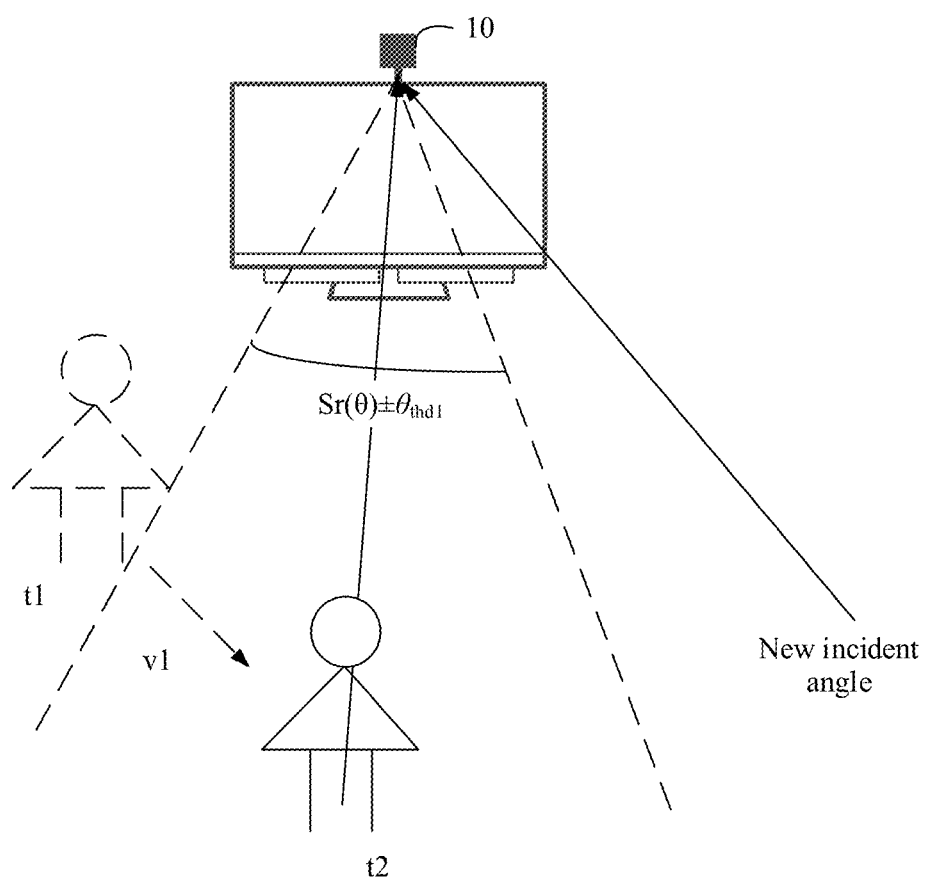
FIG. 10A is a schematic diagram of another application scenario according to this application.

For example, as shown in FIG. 10A, the object is in motion from t1 to tn moments, and the speed is v1. In this process, the candidate angle that is out of the range $\pm\theta^{thd1}$ of the radar source $S_r(\theta)$ may be selected as the new incident angle, and a candidate angle that falls within the range $\pm\theta_{thd2}$ of the radar source $S_r(\theta_r)$ is discarded.

When the moving speed of the object is not less than the preset speed, a candidate angle that is out of the range $S_r(\theta_r)\pm\theta_{thd2}$ (that is, a third preset range) of the radar source is screened out, to be used as the new incidence angle.

Figure 10B:
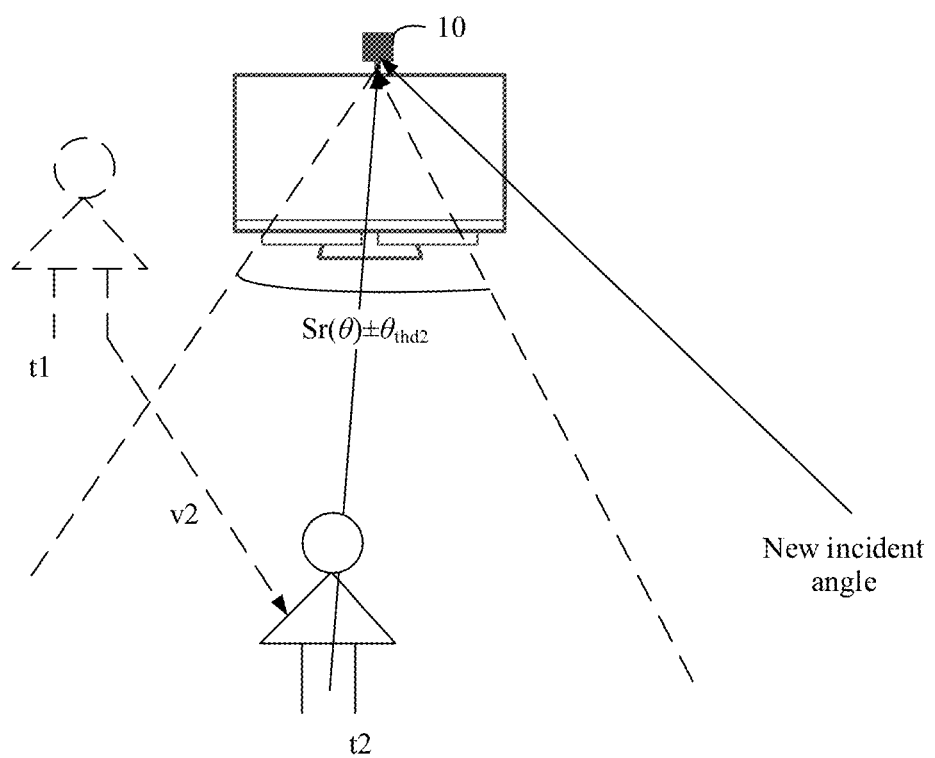
FIG. 10B is a schematic diagram of another application scenario according to this application.

For example, as shown in FIG. 10B, the object is in motion from t1 to tn moments, and the speed is v2, where v2>v1. In this process, the candidate angle that is out of the range $\pm\theta_{thd2}$ of the radar source $S_r(\theta_r)$ may be selected as the new incident angle, where $\theta_{thd2}>\theta_{thd1}$, and a candidate angle that falls within the range of the radar source $S_r(\theta_r)\pm\theta_{thd2}$ is discarded.

Figure 11:
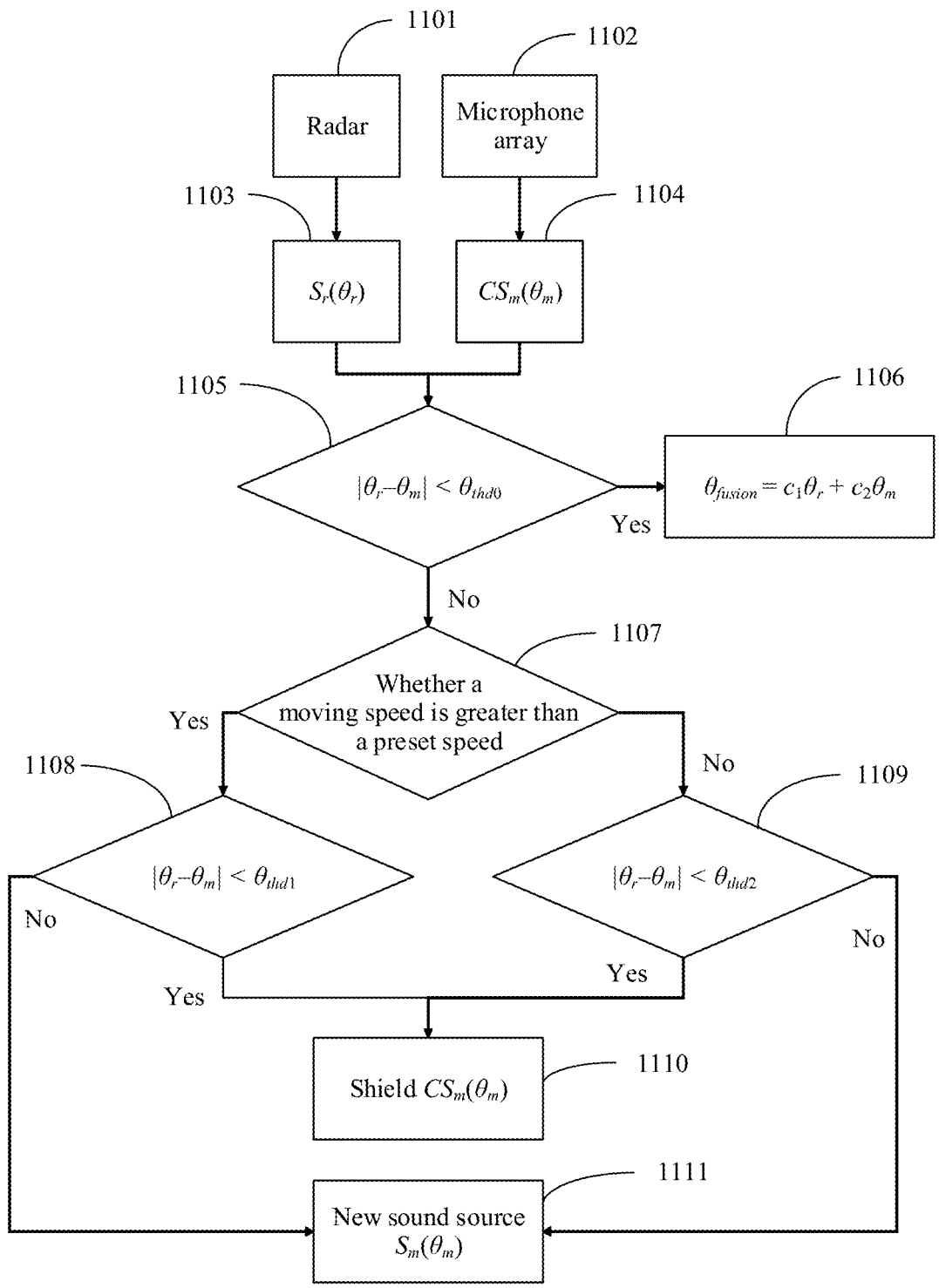
FIG. 11 is a schematic flowchart of another sound source positioning method according to this application.

For ease of understanding, the following uses an example to describe a specific application scenario with reference to FIG. 11.

The sound source positioning apparatus includes a radar 1101 and a microphone array 1102 (that is, the microphone array).

Echo data received by the radar 1101 locates a location $S_r(\theta_r)$ 1103 of an object, or referred to as a radar source. $\theta_r$ is an angle, for example, an azimuth or a pitch angle, of the object relative to the radar.

A candidate sound source $CS_m(\theta_m)$ 1104, or referred to as a sound source, is located by the microphone array 1102. $\theta_m$ is an angle of a voice signal relative to the microphone array, and the angle may specifically include the azimuth or the pitch angle.

Then, step 1105 is performed to determine whether a difference between $\theta_r$ and $\theta_m$ is less than $\theta_{thd0}$, that is, determine whether $\theta_r$ and $\theta_m$ are close.

If the difference between $\theta_r$ and $\theta_m$ is less than $\theta_{thd0}$, it indicates that there is an incident angle close to $\theta_r$, and step 1106 is performed to fuse objects $\theta_r$ and $\theta_m$, that is, obtain a fused angle $\theta_{fusion}=c_1\theta_r+c_2\theta_m$, where $c_1$ and $c_2$ are weight values.

If the difference between $\theta_r$ and $\theta_m$ is not less than $\theta_{thd0}$, it indicates that there is no incident angle close to $\theta_r$, and step 1107 may be performed to determine whether the moving speed of the object is greater than the preset speed. Specifically, a trend in locations of the object over time may be obtained based on the echo data of the radar, that is, the moving speed of the object may be estimated. For example, a track location of the object in a T time period is $([x_1, y_1], [x_2, y_2], \ldots, [x_t, y_t])$, $v=\sqrt{(y_t-y_1)^2+(x_t-x_1)^2}/T$, and whether $v$ is greater than $v_{thd}$ is determined.

If the moving speed of the object is greater than the preset speed, that is $v>v_{thd}$, step 1108 is performed, that is, whether a difference between $\theta_r$ and $\theta_m$ is less than $\theta_{thd1}$ is determined, where $\theta_{thd1}>\theta_{thd0}$. If the difference between $\theta_r$ and $\theta_m$ is less than $\theta_{thd1}$, $CS_m(\theta_m)$ is shielded (that is, step 1110). If the difference between $\theta_r$ and $\theta_m$ is not less than $\theta_{thd1}$, $CS_m(\theta_m)$ and $S_r(\theta_r)$ are combined to obtain a new sound source (that is, step 1111).

If the moving speed of the object is greater than the preset speed, that is $v \leq v_{thd}$, step 1109 is performed, that is, whether a difference between $\theta_r$ and $\theta_m$ is less than $\theta_{thd1}$ is determined, where $\theta_{thd2}<\theta_{thd1}$. If the difference between $\theta_r$ and $\theta_m$ is less than $\theta_{thd2}$, $CS_m(\theta_m)$ is shielded (that is, step 1110). If the difference between $\theta_r$ and $\theta_m$ is not less than $\theta_{thd2}$, $CS_m(\theta_m)$ and $S_r(\theta_r)$ are combined to obtain a new sound source (that is, step 1111).

Therefore, in this implementation of this application, when the sound source moves, the incident angle matching the sound source or the new incident angle may be determined based on the moving speed of the sound source, so that different moving statuses of the sound source can be adapted, and a generalization capability is strong.

After the sound source is located, a beam separation network may be updated, so that the data captured by the microphone array may be used as an input of the updated beam separation network, and the voice data of the sound source is separated.

Specifically, the beam separation network may include a voice separation model and a dereverberation model. The voice separation model is used to extract the voice data of the sound source, and the dereverberation model is used to perform dereverberation on the input data to filter some background data. Before the voice data of the sound source is output by using the beam separation network, the beam separation network may be further updated, so that the beam separation model can be adapted to different scenarios, and the voice data matching the sound source is separated. The following uses an example to describe a specific step of updating the beam separation network.

806: Update the voice separation model based on the moving speed to obtain the updated voice separation model.

The voice separation model is usually used to separate the voice data of the sound source from ambient noise.

The moving speed may be a moving speed of the sound source relative to the radar or microphone array, may be specifically obtained by using the echo data of the radar. When the radar does not detect the moving object, the moving speed may be set to 0 by default.

Usually, separation of the voice and the ambient noise relies on the voice separation model, and a manner used by the voice separation model to separate the voice relies on an incident direction of the voice or the location of the sound source. Especially in a case in which the sound source moves, a location of a parameter, in the model, relying on the direction needs to be adaptively changed. In this way, the voice data matching the location of the sound source is output.

Specifically, a parameter set of the voice separation model may be updated based on the moving speed of the sound source. The moving speed and a parameter change rate of the voice separation model are positively correlated, and the parameter change rate of the voice separation model and the parameter set are related. In this way, the updated voice separation model is obtained.

Usually, a slow parameter change may improve model stability and reduce model jitter. A fast change helps quickly adapt to an environment change. Therefore, the change rate of the model parameter may be selected based on the moving speed of the target, to affect the parameter set of the voice separation model, and obtain the updated voice separation model.

For example, it is assumed that $x_t$ is a location of the sound source at a moment t, and F is a model feature parameter generated based on the current location and a local observation value. A quantity of local parameters is excessively small, the generated model is not stable, and a location difference between two continuous moments is small. As a result, the parameter set has time correlation. Correlation of the parameters in terms of time may be described in a form of first-order regression, and the parameter set after regression smoothing is specifically indicated as $\pi_t=K_t \times \pi_{t-1}+(1-K_t) \times F(x_t)$. $K_t$ is a forgetting factor; $K_t$ affects a model update speed, and is close to 1 but less than 1; and $K_t$ is usually determined by using the moving speed of the sound source, that is, $K_t=f(\partial x_t/\partial_t)$. When the current speed is large, the forgetting factor is small, and the model is updated fast. Otherwise, when the current speed is small, the forgetting factor is large, and model is updated slowly.

Specifically, the forgetting factor and the speed may be divided into a plurality of corresponding levels in advance. After a range of the levels in which the speed is located is determined, a value of the forgetting factor may be determined, to update the voice separation model from a dimension of the speed. Usually, the speed is low, the forgetting factor is close to 1, and the model is updated slowly. This increases stability of the model. The speed is high, the forgetting factor is small, and the model is updated fast. This can adapt to a scenario in which the sound source moves quickly, to separate the voice data of the sound source from the data captured by the microphone array.

The voice separation model in this embodiment of this application may be used to separate the voice of the sound source from the ambient noise in the voice data captured by the microphone array. The voice separation model may include a model in which voice separation is performed in a generalized sidelobe cancellation beam separation manner or a multi-channel Wiener filtering manner. Specifically, for example, the voice separation model derives a weight coefficient $w_{f,t}$ of a target source, so that a complex signal of a separated target at the moment t and at an $f^{th}$ frequency is indicated as $z_{f,t}=w_{f,t}^H y_{f,t}$, where $y_{f,t}=[y_{f,t,1}, y_{f,t,2}, \ldots, y_{f,t,M}]$. $y_{f,t,m}$ is a frequency domain complex signal of a signal received by an $m^{th}$ microphone, and $w_{f,t}^H$ indicates a conjugate transposition of a complex matrix. A minimum variance distortionless response (MVDR) separation algorithm is used as an example. A weight coefficient vector may be indicated as $$w_{f,t} = \frac{R_{f,t}^{-1} r_{f,t}}{r_{f,t}^H R_{f,t}^{-1} r_{f,t}},$$

and the weight coefficient vector may be understood as the voice separation model.

A covariance matrix of the signal received by the microphone may be obtained in the following continuous recursive manner:

$$R_{f,t} = K_t \times R_{f,t-1} + (1-K_t) \times y_{f,t}^H y_{f,t}.$$

$K_t$ is a forgetting factor that determines an update speed of a parameter with time; and $r_{f,t}$ is a guidance vector, $r_{f,t}=[e^{-j\omega_f\tau_1}, e^{-j\omega_f\tau_2}, \ldots, e^{-j\omega_f\tau_M}]$ of the sound source. A parameter set that varies with the location of the sound source is $\pi_t=\{R_{f,t}|f=1, 2, \ldots, F\}$, where F is an index of a maximum frequency component.

When the sound source moves, the speed is low, the forgetting factor $K_t$ is close to 1, and the model is updated slowly. This increases the stability of the model. The speed is high, the forgetting factor $K_t$ is small, and the model is updated fast. This can adapt to the scenario in which the sound source moves quickly, to separate the voice data of the sound source from the data captured by the microphone array.

Therefore, in this implementation of this application, the voice separation model may be adaptively updated based on the moving speed of the sound source, so that the voice separation model matches the moving status of the sound source, and output accuracy of the voice separation model is improved.

807: Update, based on a distance between the object and the radar, the dereverberation model to obtain the updated dereverberation model.

The dereverberation model may be used to remove reverberation in the voice signal, and accurately output the voice data of the sound source from the data captured by the microphone array with reference to the voice separation model.

Usually, a distance between the sound source and the microphone array significantly affects reverberation of a signal received by the microphone array. When the distance is long, the voice signal generated by the sound source is transmitted over a long distance and attenuates greatly, while indoor reverberation remains unchanged, and the reverberation interferes with the voice signal greatly and lasts for long time. When the distance is short, the voice signal generated by the sound source is transmitted over a short distance and attenuates slightly, and influence of the reverberation is weakened. Therefore, a parameter of the dereverberation model may be adjusted based on the distance between the sound source and the microphone array. When the distance is long, a degree of dereverberation is increased. When the distance is short, the degree of dereverberation is reduced, and excessive dereverberation is prevented from interfering with the voice signal. Even when the distance is very small, for example, less than a preset minimum value, dereverberation may be stopped to improve quality of the obtained voice data.

Specifically, a delay parameter and a prediction order of the dereverberation model may be updated based on the distance between the sound source and the microphone array or the radar, to obtain the updated dereverberation model. The delay parameter indicates duration in which the reverberation signal lags behind the voice data of the sound source, the prediction order indicates duration of the reverberation, and both the delay parameter and the prediction order are positively correlated with the distance. Therefore, after the distance is determined, the delay parameter and the prediction order can be determined based on the distance, and the new dereverberation model can be obtained.

The dereverberation model may specifically include a model of a voice dereverberation algorithm based on blind system identification and equalization, a model of a voice dereverberation algorithm based on a source model, a model of a voice dereverberation algorithm based on a room reverberation model and spectrum enhancement, or the like. For example, the dereverberation model in this embodiment may be a multi-channel linear prediction model, for example, indicated as:

$$x_{t,f,d}^{early} = y_{t,f,d} - \sum_{\tau=\Delta}^{\Delta+K-1} \sum_{d'} g^*_{\tau,f,d,d'} y_{t-\tau,f,d'}.$$

$y_{t,f,m}$ is an observable signal of the $m^{th}$ microphone on an $f^{th}$ frequency component at the moment t, and $g^*_{\tau,f,m,m'}$ is a linear prediction coefficient that spans a plurality of channels and that is for an $m^{th}$ channel. $\Delta$ indicates time when late reverberation lags behind a direct signal. K indicates an order of the linear prediction model, and also indicates duration of the late reverberation. A linear prediction coefficient g may be obtained through auto-regressive modeling. However, the order K of the model is very important. If a value of K is excessively large, excessive reverberation is caused. If the value of K is excessively small, insufficient reverberation is caused. The prediction order K is determined based on the location of the sound source, and the delay parameter and the prediction order are positively correlated with the distance. Therefore, after the distance is obtained, the delay parameter and the prediction order can be determined, so that the dereverberation model matching the sound source is obtained.

In this implementation of this application, the value of K is determined based on the distance between the object and the microphone. When the distance is large, the reverberation is stronger in terms of the direct signal. Therefore, a large K value needs to be selected for sufficient dereverberation. When the distance is short, a small K value may be used for slight dereverberation.

$$\text{For example } K = \begin{cases} k_0 & d < \delta_0 \\ k_1 & \delta_0 < d < \delta_1 \\ k_2 & \delta_1 < d < \delta_2 \end{cases}.$$

d indicates the distance between the sound source and the microphone array. Values of $\delta_0$, $\delta_1$, and $\delta_2$ may be adjusted based on an actual application scenario. This is not limited herein.

Therefore, in this implementation of this application, the dereverberation model may be updated based on the distance between the sound source and the radar or the microphone array, so that the dereverberation model is adapted to an environment in which the sound source is currently located. In this way, the voice signal of the sound source is output more accurately with reference to the voice separation model.

808: Use the data captured by the microphone array as the input of the beam separation network, and output the voice data of the sound source and the background data.

Because the beam separation network includes the voice separation model and the dereverberation model, after the voice separation model and the dereverberation model are updated, the data captured by the microphone array is used as the input of the beam separation network, and the voice data of the sound source and the background data are output.

The background data is data other than the data of the sound source in the data captured by the microphone array. For example, in a scenario in which a user speaks, data may be captured by the microphone array, and voice data of the user and background data generated in an environment in which the user is located are separated from the data by the beam separation network.

Therefore, in this implementation of this application, the voice separation model is updated from the dimension of the speed, and the reverberation model is updated from a dimension of a distance. Regardless of whether the sound source moves or is static, the parameter of the beam separation network may be adjusted to adapt to a status of the sound source. In this way, the voice data that is more suitable for the sound source is separated.

809: Determine whether the voice data meets a preset condition; and if yes, continue to perform step 801, or if no, perform step 810.

After the voice data of the sound source is separated from the data captured by the microphone array based on the beam separation network, whether the voice data meets the preset condition may be further determined. If the voice data does not meet the preset condition, a beam for processing the sound source may be disabled, that is, step 810 is performed. If the voice data meets the preset condition, the voice data of the sound source may be continuously tracked, that is, steps 801 to 809 are continued.

The preset condition may be adjusted based on an actual scenario. For example, the preset condition may include: Voice data picked up by using the beam is less than a preset value, the picked-up voice data is a signal of a non-voice type, the picked-up voice data is a voice generated by a device, a sound source in a specific direction or a specific type of sound source specified by the user is shielded, or the like. For example, the preset condition may include: Sound pressure is less than 43 dB; the picked-up voice data is an ambient sound, noise, or the like; the picked-up voice data is a voice generated by a speaker of a television, stereo, PC, or the like; a sound source in a specific direction or a specific type of sound source specified by the user is shielded, for example, a sound of a dog, a sound of a child, or a sound opposite to the user is shielded; or the like.

Usually, one sound source corresponds to one beam separation model. If there are a plurality of sound sources, a plurality of beam separation models may be obtained through an update based on information about each sound source, and the user extracts voice data of each sound source. The beam separation model may be understood as follows: The beam is used to extract data in a direction in the data captured by the microphone array, to directionally collect, by the microphone array, a voice generated by a sound source in a direction.

Figure 12:
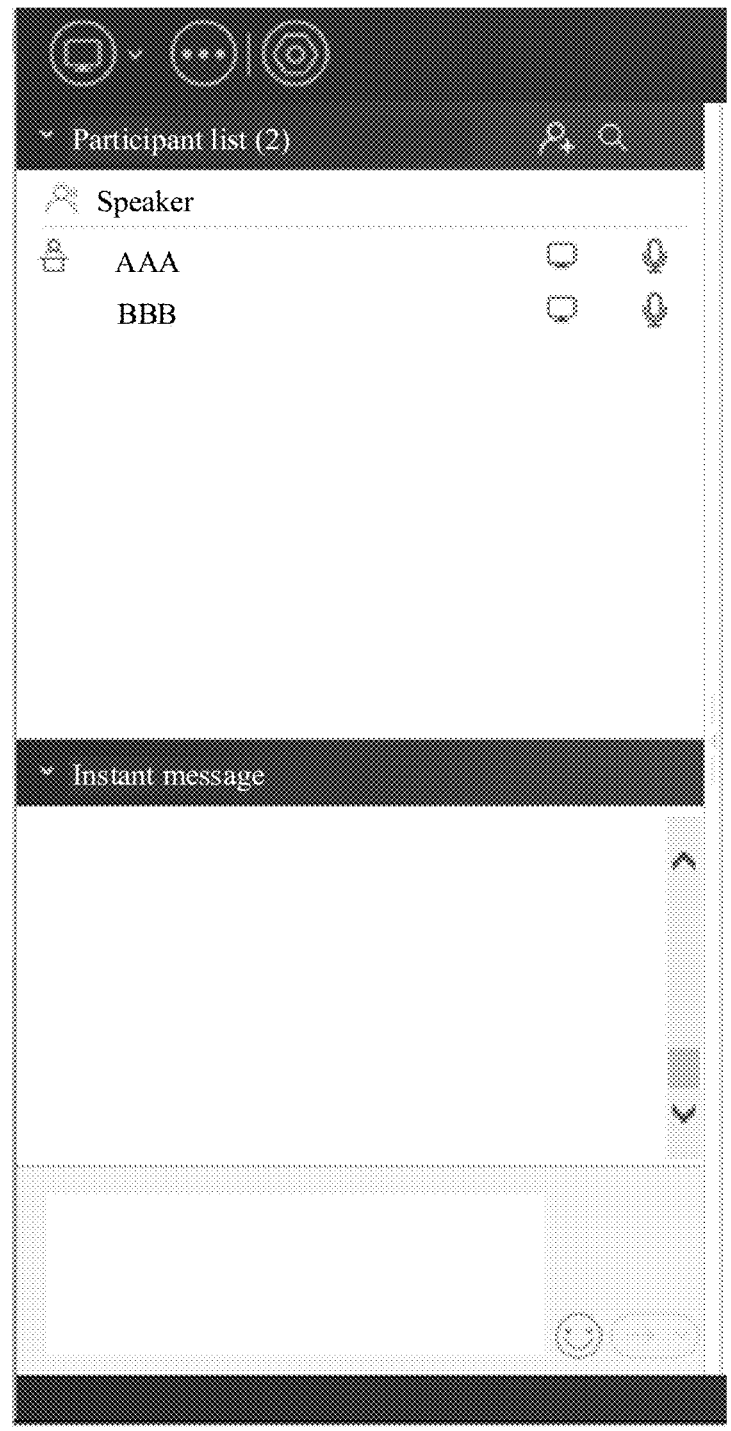
FIG. 12 is a schematic diagram of another application scenario according to this application.

In addition, in a possible scenario, a type of the sound source may be further detected by using the voice data of the sound source, and the type of the sound source is displayed on a display interface. Specifically, a feature may be extracted from the voice data by using a feature extraction network to obtain an acoustic feature of the sound source; a first probability that the sound source is a living object is recognized based on the acoustic feature; a second probability that the sound source is the living object is further determined based on the echo data of the radar; and the first probability and the second probability are fused to obtain a fusion result indicating whether the sound source is the living object. A specific fusion manner may include a weighted summation manner, a product manner, a logarithm summation manner, or the like for fusion. When a probability value obtained after fusion is greater than a preset probability value, it may be determined that the sound source is the living object. For example, if the probability value after fusion is greater than 80%, it may be determined that the sound source is the living object. For example, as shown in FIG. 12, when a multi-party conference is held, after it is recognized that an object that currently generates a voice is a speaker, if the voice of the object is not shielded, a type of the object that currently makes a sound may be displayed on the display interface as the speaker, thereby improving user experience.

Specifically, for example, the microphone array obtains a plurality of incident directions by locating the sound source, enhances each sound signal by using the beam separation model, eliminates a non-voice source by using a voice activity detector, and retains a voice source signal. The foregoing voice source direction is set to $(\alpha_1, \alpha_2, \ldots, \alpha_n)$. For each enhanced voice signal, an acoustic feature is extracted, and is sent to a living voice detector (for example, a trained neural network), and a posterior probability $(p_a(\alpha_1), p_a(\alpha_2), \ldots, p_a(\alpha_n))$ that each sound signal is a living voice is output. Moving track information of living objects in the plurality of directions is tracked by the radar. It is assumed that there is motion information (track) in a direction $\alpha$. It is inclined to determine that a voice in the direction $\alpha$ is the living voice, and a prior probability $p_r(\alpha) > 0.5$ of the living voice in the direction is set. Conversely, the prior probability is set to a value less than 0.5. A prior probability of a non-living voice is $1-p_r(\alpha)$. The product manner is used to calculate a probability that the voice in the direction $\alpha$ is the living voice: $p_{true}(\alpha) = p_a(\alpha) \times p_r(\alpha)$, and a probability that the voice in the direction $p_{true}(\alpha) = p_a(\alpha) \times p_r(\alpha)$ is the non-living voice: $p_{false}(\alpha) = (1-p_a(\alpha)) \times (1-p_r(\alpha))$. If $p_{true}(\alpha) > p_{false}(\alpha)$, the sound source in the direction $\alpha$ is considered to be the living voice.

For example, a deep convolutional neural network (DCNN), a recurrent neural network (RNNS), or the like may be selected for the feature extraction network and a feature identification network. The neural network mentioned in this application may include a plurality of types, for example, a deep neural network (DNN), a convolutional neural network (CNN), a recurrent neural network (RNN), another neural network of a residual network, or the like. The acoustic feature of the sound source is extracted from the voice data by using the feature extraction network, and the probability that the sound source corresponding to the acoustic feature is the living object is output by using the identification network, to obtain a value of the first probability, for example, the probability that the sound source is the living object is 80%. Second, the probability that the sound source is the living object is alternatively determined by determining information such as moving amplitude, the moving speed, a moving period of the sound source by using the echo data of the radar. In other words, whether the sound source moves is determined, and the second probability is determined. If the probability of whether the sound source is the living object is 75%, weighted fusion may be performed on 80% and 75%, where if weights are determined to be 0.6 and 0.4 respectively, a fused probability is 85%×0.6+75%×0.4=81%, that is, the probability that the sound source is the living object is 81%.

Usually, in some scenarios, when the probability that the sound source is determined to be the living object by using the echo data of the radar is 0, even if the probability that the sound source is recognized as the living object by using the identification network is very high, for example, higher than 95%, the sound source is determined as the non-living object.

In some other scenarios, if it is determined that there is a living object in a current scenario by using the echo data of the radar, but the sound source is not recognized, by using the voice data, to have a living object feature, it may be a case in which the living object does not make a sound, and it may be determined that the sound source is a non-living object. It may be understood that when a value of the first probability is lower than a third threshold, a weight value set for the first probability is much higher than a weight value set for the second probability when weighted fusion is performed, so that the fusion result is more inclined to a result indicated by the value of first probability. Correspondingly, when a value of the second probability is lower than a fourth threshold, a weight value set for the second probability is much higher than a weight value set for the first probability when weighted fusion is performed, so that the fusion result is more inclined to a result indicated by the value of the second probability. Therefore, in this embodiment of this application, the acoustic feature and the moving status detected by the radar may be effectively combined, to determine whether the sound source is the living object. Therefore, a more accurate result is obtained.

Further, the foregoing living object may be replaced with a human body, a feature may be extracted from the voice data by using the feature extraction network, the voice feature is used to recognize a first probability that the sound source generating the voice is the human body, and a second probability that the sound source is the human body is obtained by the radar detecting whether the sound source moves. Weighted fusion is performed on the first probability and the second probability to obtain a probability value indicating whether the sound source is the human body, to determine, based on the probability value, whether the sound source is the human body. Therefore, the radar and the sound source feature may be combined to recognize whether the sounding object is the human body, to obtain a very accurate recognition result.

Therefore, for a problem, in an existing solution, that it is difficult to recognize that speaker makes a sound and the living object makes a sound, this application accurately recognizes whether the sound source that currently makes a sound is the living object by combining the radar and the acoustic feature. Second, when a silent person and the speaker exist simultaneously, a motion detection mode of a traditional radar is prone to misjudgment. However, the acoustic feature can be used to distinguish the silent person and the speaker, the speaker is in a long-term static state, and a long-term motion feature may exclude the speaker from the living voice.

810: Disable the beam.

For ease of understanding, the beam may be understood as an algorithm or a vector for extracting voice data in a direction from the microphone array. Disabling the beam means that the voice data in the direction is not extracted by using the beam, for example, the foregoing beam separation network is disabled.

For example, when the voice signal picked up by the beam gradually disappears, for example the sound pressure is below 43 dB, that is, the beam for the sound source is disabled. For another example, when it is determined that the voice data is data generated by the speaker, a beam for the speaker is disabled. For another example, the user may specify that a beam in a specified direction is disabled.

Therefore, in this implementation of this application, the location of the sound source may be accurately determined by using the microphone array and the radar. Regardless of whether the sounding object is static or moves, the specific location of the sound source can be detected, and the sound source can be tracked. This can adapt to more scenarios, and the generalization capability is strong. In addition, beam management may be performed by recognizing a type of the sound source, to avoid picking up an invalid voice, improve work efficiency, and reduce the load.

Figure 13:
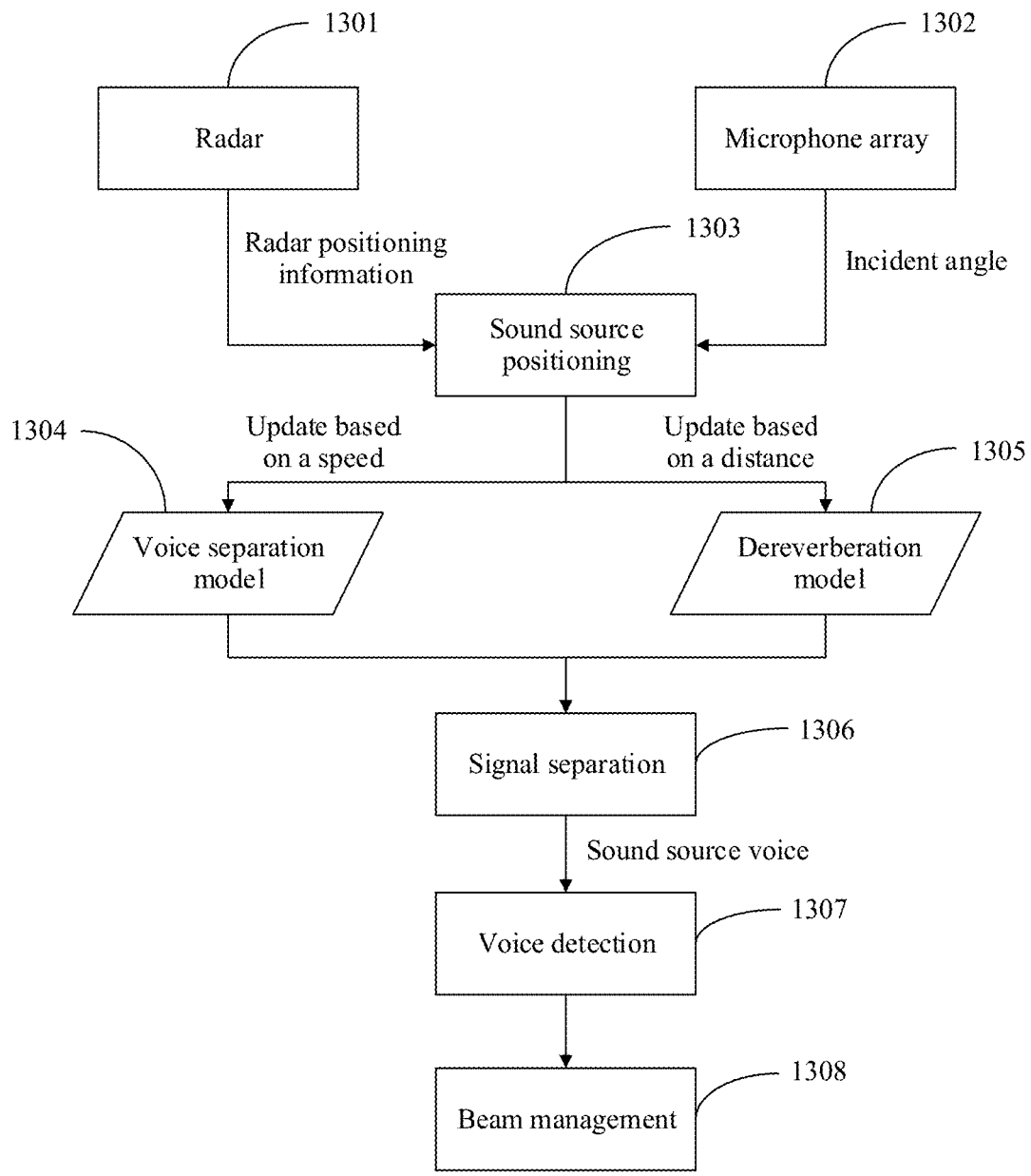
FIG. 13 is a schematic flowchart of another sound source positioning method according to this application.
Figure 14:
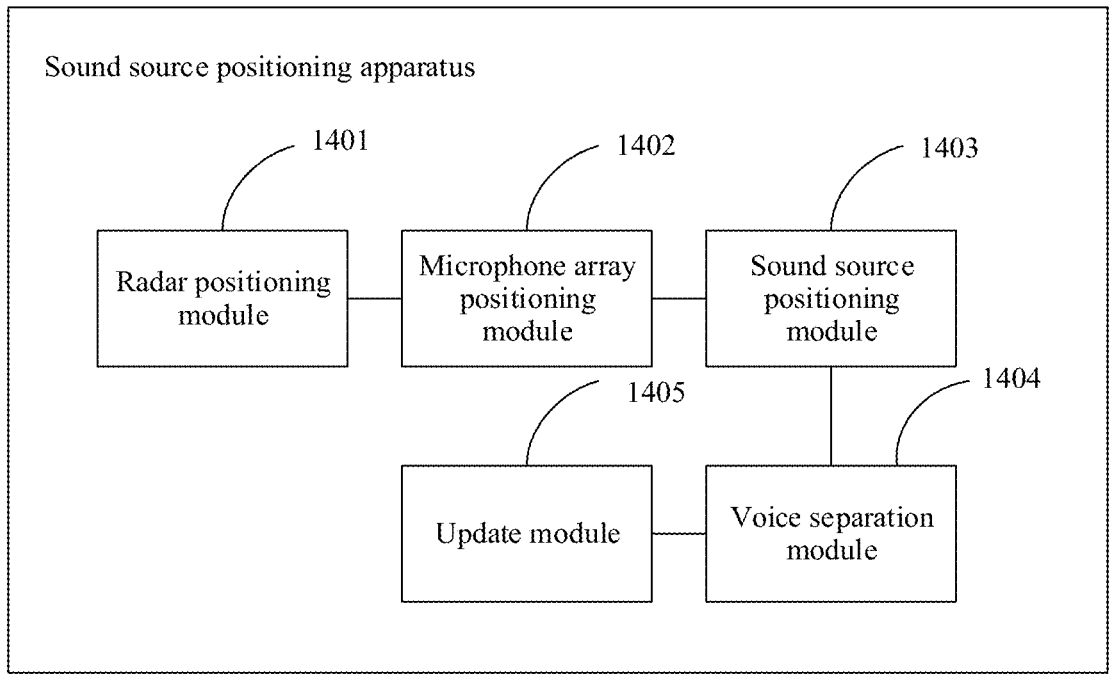
FIG. 14 is a schematic diagram of a structure of another sound source positioning apparatus according to this application.

For further ease of understanding, refer to FIG. 13. The following describes an example of an application scenario of the sound source positioning method provided in this application.

First, radar positioning information is obtained by using a radar 1301, and an incident angle at which a voice signal is incident to a microphone array is obtained by using the microphone array 1302.

The radar positioning information may include a moving status of the object within a radiation range of the radar within a period of time, for example, information such as a moving track, an acceleration, a speed relative to the radar, or a distance relative to the radar that is of the object within the radiation range. For example, the radar may transmit a modulated wave within the radiation range, the modulated wave is received by the radar after being reflected by the object, and an echo signal is formed. Echo data includes information generated when one or more detected objects move within the detection range of the radar, for example, information about a track change generated when a hand of a user moves within the radiation range. For a specific structure of the radar, refer to the foregoing FIG. 1D. Details are not described herein again.

For example, the radar may be a millimeter wave radar. For frequency bands whose operating frequencies are in 60 GHz and 77 GHz, a radar whose bandwidth is greater than 4 GHz and whose distance resolution is up to a centimeter level may be used. The millimeter wave radar may have a multiple-receive multiple-transmit antenna array, and can estimate a horizontal azimuth and a vertical azimuth of a moving object. The radar positioning information may include a distance or an angle of the object relative to the radar. Distance information is included in frequencies of echo pulses, and fast Fourier transform may be performed, in short time, on a single pulse to obtain distance information of the object within current pulse time. The distance information of the pulses is integrated to obtain overall distance change information of the object. The angle may include the azimuth and the pitch angle, and the angle is obtained based on a multiple-receive antenna and by measuring phase differences of received echoes. There may be a specific angle between the echo signal and the receive antenna due to a location of a reflection object. The angle may be calculated through calculation, so that a specific location of the reflection object may be learned, and a location change status of the object may be learned. The angle may be calculated in a plurality of manners. For example, a coordinate system centering on the radar is established, and a location of the object in the coordinate system is calculated based on the echo data, so that the pitch angle or the azimuth is obtained. Specifically, for example, a multiple signal classification algorithm (MUSIC) may be used to calculate an angle, including the pitch angle, the azimuth, or the like. A four-receive antenna array of the radar is used to measure an angle change of the object.

Sound source positioning 1303 is performed based on the radar positioning information and the incident angle, and an actual location of a sound source relative to the radar or the microphone array is located.

Specifically, weighted fusion may be performed on the angle and the incident angle included in the radar positioning information, to obtain a fused angle of the sound source relative to the microphone array or the radar. In this way, the actual location of the sound source relative to the radar or the microphone array is determined.

In a process of determining the fused angle, there are a plurality of options. If the microphone array locates a plurality of candidate angles, an angle closest to the angle detected by the radar may be selected as the incident angle. Alternatively, when the object moves at a fast speed, the microphone array detects a plurality of candidate angles over a period of time, and an angle far from the angle detected by the radar may be selected as a new incident angle. For details, refer to the related description in the foregoing step 805.

Subsequently, a voice separation model 1304 is updated based on a moving speed of the sound source, and a dereverberation model 1305 is updated based on a relative distance between the sound source and the radar.

The updated voice separation model and the updated dereverberation model form a beam separation network, and perform signal separation 1306 on data captured by the microphone array 1302, to separate voice data of the sound source.

The voice separation model and the dereverberation model are included in the beam separation network, which may be understood as forming a beam for the sound source by using the beam separation network, to separate the data captured by the microphone array, and extract the voice data of the sound source and voice data generated by a background object.

Voice detection 1307 is performed on the voice data of the sound source, to recognize whether the sound source is a living object.

It may be understood that whether the voice data is a sound generated by the living object is determined by recognizing an acoustic feature of the voice data. In addition, in addition to recognizing whether the sound source is the living object by using the acoustic feature of the voice data, a moving feature (for example, movement caused by walking when the object speaks, another feature generated by periodic movement, or the like) detected by the radar may also be combined, to further determine whether the sound source is the living object. In this way, whether the sound source is the living object can be accurately detected.

For example, an acoustic feature of a sound source A is extracted for detection, and a probability that A is a living object is recognized. Based on that the radar detects whether the object moves, a probability of existence of a living object in a scenario is obtained. Two modal detection results may be fused in a form of product, and the existence of the living object is determined based on a fused probability. Usually, when the radar determines the probability of the existence of the living object to be zero, even if a high probability of existence is given by using an acoustic modality, the fused probability is close to zero, and it is determined that there is no living voice in the scenario. When a target living object in the scenario does not make a sound, even if it is determined that the probability of the existence of the living object is very high by using a radar modality, a low probability of existence of a voice may be given by using the acoustic modality, and it is still determined that there is no living object. Two difficult problems that cannot be overcome by using a traditional method are effectively overcome by using dual-modal living voice detection. First, it is difficult to distinguish between a sound of a high-fidelity speaker and a living voice, and spectral characteristics of the sound of the high-fidelity speaker and the living voice are almost identical. However, motion detection of the radar can easily distinguish the sound of the high-fidelity speaker and the living voice. Second, a silent person and the speaker exist simultaneously, and a motion detection mode of a traditional radar is prone to misjudgment. However, the acoustic feature can be used to distinguish the silent person and the speaker, the speaker is in a long-term static state, and a long-term motion feature detected by using an echo of the radar may exclude the speaker from the living voice.

Beam management 1308 is performed based on a detection result to determine whether to retain the beam for the sound source.

After sound source detection is performed, it may be determined, based on a result of the sound source detection, whether to disable the beam for the sound source. Usually, there are some basic rules in a home scenario, and examples are as follows: (1) Usually, only a human body moves, a moving object detected by the radar is highly likely to be the human body, and even if the human body does not make a sound at a current moment, there is a high probability of sounding in the future; (2) a speaker sounding device, for example, a television, a stereo, or the like is usually in a static state, may certainly move in some scenarios, and the speaker sounding device has a specific movement pattern; (3) a person sometimes speaks in the static state, and sometimes speaks when walking; (4) a living object is usually mobile; and (5) a voice signal is sometimes strong and sometimes weak, and even if a sound source positioning device misses some weak syllables, it may not cause semantic misunderstanding. Therefore, with reference to these rules, whether the sound source is the living object can be accurately recognized, and whether the beam for performing voice extraction on the sound source is disabled is determined based on the recognition result. Therefore, in this implementation of this application, the sound source is located with reference to the radar and the microphone array, so that the beam for extracting the voice of the sound source is determined based on the positioning, and the voice data of the sound source is accurately extracted.

The foregoing describes in detail a procedure of the method provided in this application. The following describes in detail a structure of an apparatus provided in this application with reference to the foregoing method procedure.

First, this application provides a sound source positioning apparatus, configured to perform the steps of the method in FIG. 2 to FIG. 13. The sound source positioning apparatus may include:

a radar positioning module, configured to obtain first location information by using echo data of a radar, where the first location information includes location information of an object relative to the radar;

a microphone array positioning module, configured to obtain an incident angle by using a voice signal captured by a microphone array, where the incident angle is an angle at which the voice signal is incident to the microphone array; and a sound source positioning module, configured to: if the first location information includes a first angle of the object relative to the radar, fuse, based on the first location information and the incident angle, to obtain second location information, where the second location information includes location information of a sound source generating the voice signal.

In one embodiment, the apparatus further includes:

a voice separation module, configured to extract, based on the second location information, voice data of the sound source from the voice signal captured by the microphone array.

In one embodiment, the voice separation module is specifically configured to: use data captured by the microphone array as an input of a preset beam separation network, and output the voice data of the sound source.

In one embodiment, the beam separation network includes a voice separation model for separating the voice data of the sound source and background data in the input data, and the apparatus further includes:

an update module, configured to: before that a voice signal captured by the microphone array is used as an input of a preset beam separation network, determine a moving speed of the sound source based on the echo data; and update the voice separation model based on the moving speed to obtain the updated voice separation model.

In one embodiment, the update module is specifically configured to determine a parameter set of the voice separation model based on the moving speed, to obtain the updated voice separation model, where the parameter set is related to a change rate of a parameter of the voice separation model, and the moving speed and the change rate are positively correlated.

In one embodiment, the beam separation network further includes a dereverberation model, and the dereverberation model is used to filter out a reverberation signal in the input data.

The update module is further configured to: before that a voice signal captured by the microphone array is used as an input of a preset beam separation network, update, based on a distance between the object and the radar, the dereverberation model to obtain the updated dereverberation model.

In one embodiment, the update module is specifically configured to update, based on the distance between the object and the radar, a delay parameter and a prediction order in the dereverberation model to obtain the updated dereverberation model, where the delay parameter indicates duration of the reverberation signal lagging behind the voice data of the sound source, the prediction order indicates duration of reverberation, and both the delay parameter and the prediction order are positively correlated with the distance.

In one embodiment, the voice separation module is further configured to: if the voice data of the sound source does not meet a preset condition, remove a beam used to process the data corresponding to the sound source in the data captured by the microphone array.

In one embodiment, the apparatus further includes a liveness detection unit configured to: extract a feature from the voice data to obtain an acoustic feature of the sound source; recognize, based on the acoustic feature, a first probability that the sound source is a living object; determine, based on the echo data of the radar, a second probability that the sound source is the living object; and fuse the first probability and the second probability to obtain a fusion result, where the fusion result indicates whether the sound source is the living object.

In one embodiment, the first angle and the incident angle are in a same coordinate system, and the sound source positioning module is specifically configured to: determine a first weight corresponding to the first angle and a second weight corresponding to the incident angle, where the first weight and a moving speed of the object relative to the radar are positively correlated, and the second weight and the moving speed of the object relative to the radar are negatively correlated; and perform weighted fusion on the angle and the incident angle based on the first weight and the second weight to obtain a fused angle, where the second location information includes the fused angle.

In one embodiment, the microphone array positioning module is specifically configured to: if a plurality of second angles are obtained by using the voice signal captured by the microphone array, and the first angle and the plurality of second angles are in a same coordinate system, select, from the plurality of second angles as the incident angle, an angle that has a smallest difference between the angle and the first angle or an angle whose difference between the angle and the first angle falls within a first preset range.

In one embodiment, the microphone array positioning module is specifically configured to: after obtaining the incident angle by using the voice signal captured by the microphone array, if a plurality of third angles are obtained based on the data captured by the microphone array for another time, select, based on the moving speed of the object, an angle from the plurality of third angles, and use the angle as the new incident angle.

In one embodiment, the microphone array positioning module is specifically configured to: if the moving speed of the object is greater than a preset speed, screen out, from the plurality of third angles, an angle whose difference between the angle and the first angle falls within a second preset range, and use the angle as the new incident angle; or if the moving speed of the object is not greater than the preset speed, screen out, from the plurality of third angles, an angle whose difference between the angle and the first angle falls within a third preset range, and use the angle as the new incident angle, where the third preset range covers and is greater than the second preset range.

In one embodiment, the sound source positioning module is further configured to: if the first location information does not include the first angle, use the incident angle as an angle of the sound source relative to the microphone array.

In one embodiment, the sound source positioning module is further configured to: before the incident angle is obtained by using the voice signal captured by the microphone array, if the location information of the object moving within the detection range of the radar is determined by using the echo data, and the object does not make a sound, adjust a sound source detection threshold of the microphone array for the object, where the microphone array is configured to capture a voice signal whose sound pressure is higher than the sound source detection threshold.

In one embodiment, the first location information further includes a first relative distance between the object and the radar, and the sound source positioning module is further configured to: obtain a second relative distance between the object and the microphone array by using the voice signal captured by the microphone array; and fuse the first relative distance and the second relative distance to obtain a fused distance, where the fused distance indicates a distance of the sound source relative to the microphone array, and the second location information further includes the fused distance.

Figure 15:
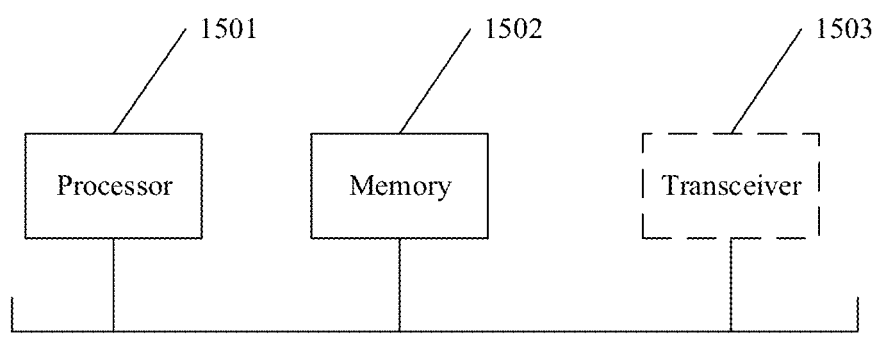
FIG. 15 is a schematic diagram of a structure of another sound source positioning apparatus according to this application.

FIG. 15 is a schematic diagram of a structure of another sound source positioning apparatus according to this application. Details are as follows.

The sound source positioning apparatus may include a processor 1501 and a memory 1502. The processor 1501 and the memory 1502 are interconnected through a line. The memory 1502 stores program instructions and data.

The memory 1502 stores the program instructions and the data corresponding to steps corresponding to FIG. 2 to FIG. 13.

The processor 1501 is configured to perform the method steps performed by the sound source positioning apparatus shown in any one of the foregoing embodiments in FIG. 2 to FIG. 13.

In one embodiment, the sound source positioning apparatus may further include a transceiver 1503, configured to receive or send data.

In one embodiment, the sound source positioning apparatus may further include a radar and/or a microphone array (not shown in FIG. 15), or establish a connection with a radar and/or a microphone array (not shown in FIG. 15). The radar and/or the microphone array may refer to the radar and/or the microphone array mentioned in FIG. 2 to FIG. 13. Details are not described herein again.

An embodiment of this application further provides a computer-readable storage medium. The computer-readable storage medium stores a program used to generate a vehicle travel speed. When the program is run on a computer, the computer is enabled to perform the steps in the methods described in embodiments shown in FIG. 2 to FIG. 13.

In one embodiment, the sound source positioning apparatus shown in FIG. 15 is a chip.

An embodiment of this application further provides a sound source positioning apparatus. The sound source positioning apparatus may also be referred to as a digital processing chip or a chip. The chip includes a processing unit and a communication interface. The processing unit obtains program instructions through the communication interface, and when the program instructions are executed by the processing unit, the processing unit is configured to perform the method steps performed by the sound source positioning apparatus in any one of the foregoing embodiments in FIG. 2 to FIG. 13.

An embodiment of this application further provides a digital processing chip. A circuit and one or more interfaces that are configured to implement functions of the processor 1501 or the processor 1501 are integrated into the digital processing chip. When a memory is integrated into the digital processing chip, the digital processing chip may complete the method steps in any one or more of the foregoing embodiments. When a memory is not integrated into the digital processing chip, the digital processing chip may be connected to an external memory through a communication interface. The digital processing chip implements, based on program code stored in the external memory, the actions performed by the sound source positioning apparatus in the foregoing embodiments.

An embodiment of this application further provides a computer program product. When the computer program product runs on a computer, the computer is enabled to perform the steps performed by the sound source positioning apparatus in the methods described in embodiments shown in FIG. 2 to FIG. 13.

The sound source positioning apparatus in this embodiment of this application may be a chip. The chip includes a processing unit and a communication unit. The processing unit may be, for example, a processor, and the communication unit may be, for example, an input/output interface, a pin, a circuit, or the like. The processing unit may execute computer-executable instructions stored in a storage unit, so that the chip performs the sound source positioning method described in embodiments shown in FIG. 2 to FIG. 13. In one embodiment, the storage unit is a storage unit in the chip, for example, a register or a cache; or the storage unit may be a storage unit that is in a radio access device end and that is located outside the chip, for example, a read-only memory (ROM), another type of static storage device that can store static information and instructions, a random access memory (RAM), or the like.

Specifically, the processing unit or the processor may be a central processing unit (CPU), a network processor (NPU), a graphics processing unit (GPU), a digital signal processor (DSP), an application-specific integrated circuit (ASIC), a field programmable gate array (FPGA), another programmable logic device, a discrete gate or a transistor logic device, a discrete hardware component, or the like. The general purpose processor may be a microprocessor or any regular processor or the like.

Figure 16:
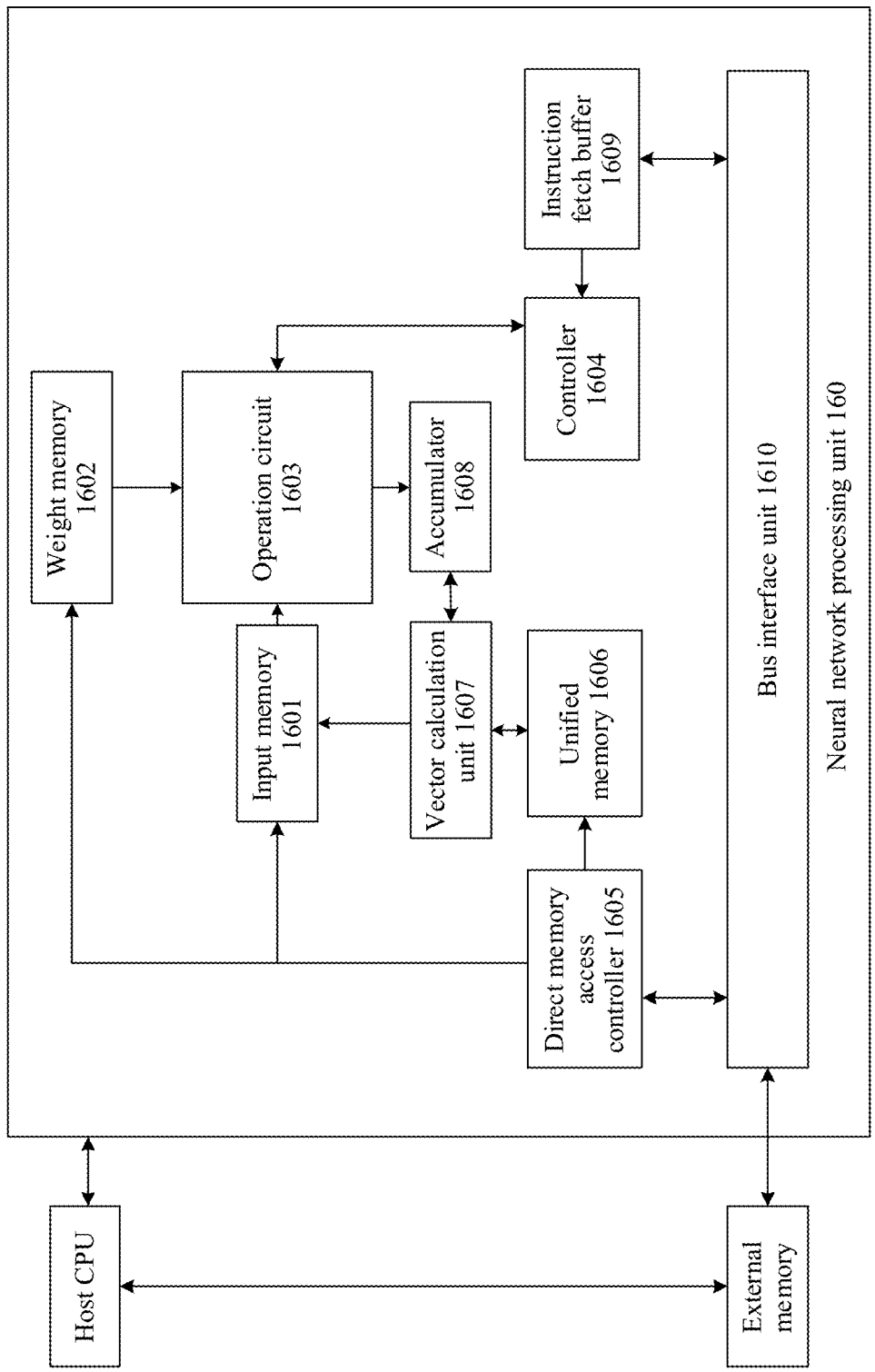
FIG. 16 is a schematic diagram of a structure of a chip according to this application.

For example, FIG. 16 is a schematic diagram of a structure of a chip according to an embodiment of this application. The chip may be represented as a neural network processing unit NPU 160. The NPU 160 is mounted to a host CPU as a coprocessor, and the host CPU allocates a task. A core part of the NPU is an operation circuit 1603, and a controller 1604 controls the operation circuit 1603 to extract matrix data in a memory and perform a multiplication operation.

In some implementations, the operation circuit 1603 includes a plurality of processing engines (PE) inside. In some implementations, the operation circuit 1603 is a two-dimensional systolic array. The operation circuit 1603 may alternatively be a one-dimensional systolic array or another electronic circuit capable of performing mathematical operations such as multiplication and addition. In some implementations, the operation circuit 1603 is a general-purpose matrix processor.

For example, it is assumed that there is an input matrix A, a weight matrix B, and an output matrix C. The operation circuit fetches data corresponding to the matrix B from a weight memory 1602, and buffers the data on each PE in the operation circuit. The operation circuit fetches data of the matrix A from an input memory 1601 to perform a matrix operation on the matrix B, to obtain a partial result or a final result of the matrix, which is stored in an accumulator 1608.

A unified memory 1606 is configured to store input data and output data. Weight data is directly transferred to the weight memory 1602 by using a direct memory access controller (DMAC) 1605. The input data is also transferred to the unified memory 1606 by using the DMAC 1605.

A bus interface unit (BIU) 1610 is configured to interact with the DMAC and an instruction fetch buffer (IFB) 1609 through an AXI bus.

The bus interface unit (BIU) 1610 is used by the instruction fetch buffer 1609 to obtain instructions from an external memory, and is further used by the direct memory access controller 1605 to obtain original data of the input matrix A or the weight matrix B from the external memory.

The DMAC is mainly configured to transfer input data in the external memory DDR to the unified memory 1606, transfer weight data to the weight memory 1602, or transfer input data to the input memory 1601.

A vector calculation unit 1607 includes a plurality of operation processing units. If required, further processing is performed on an output of the operation circuit, for example, vector multiplication, vector addition, an exponential operation, a logarithmic operation, or value comparison. The vector calculation unit 1607 is mainly configured to perform network calculation at a non-convolutional/fully connected layer in a neural network, for example, batch normalization, pixel-level summation, and upsampling on a feature plane.

In some implementations, the vector calculation unit 1607 can store a processed output vector in the unified memory 1606. For example, the vector calculation unit 1607 may apply a linear function or a non-linear function to the output of the operation circuit 1603, for example, perform linear interpolation on a feature plane extracted at a convolutional layer. For another example, the linear function or the non-linear function is applied to a vector of an accumulated value to generate an activation value. In some implementations, the vector calculation unit 1607 generates a normalized value, a pixel-level summation value, or both. In some implementations, the processed output vector can be used as an activation input to the operation circuit 1603, for example, to be used at a subsequent layer in the neural network.

The instruction fetch buffer (instruction fetch buffer)-1609 connected to the controller 1604 is configured to store instructions used by the controller 1604.

The unified memory 1606, the input memory 1601, the weight memory 1602, and the instruction fetch buffer 1609 are all on-chip memories. The external memory is private for an NPU hardware architecture.

An operation at each layer in a recurrent neural network may be performed by the operation circuit 1603 or the vector calculation unit 1607.

The processor mentioned above may be a general-purpose central processing unit, a microprocessor, an ASIC, or one or more integrated circuits for controlling program execution of the methods in FIG. 2 to FIG. 13.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected based on an actual requirement to achieve the objectives of the solutions of embodiments. In addition, in the accompanying drawings of the apparatus embodiments provided in this application, connection relationships between the modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any function performed by a computer program can be easily implemented by using corresponding hardware, and a specific hardware structure used to achieve a same function may be of various forms, for example, in a form of an analog circuit, a digital circuit, an application-specific circuit, or the like. However, in this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, or a network device) to perform the methods described in embodiments of this application.

All or some of foregoing embodiments may be implemented by using software, hardware, firmware, or any combination thereof. When the software is used to implement embodiments, all or a part of embodiments may be implemented in a form of a computer program product.

The computer program product includes one or more computer instructions. When the computer program instructions are loaded and executed on the computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD), or the like.

In this application, terms such as "first", "second", "third", and "fourth" (if exists) in the specification, the claims, and the accompanying drawings are intended to distinguish between similar objects but do not necessarily indicate a specific order or sequence. It should be understood that the data used in such a way are interchangeable in proper cases, so that embodiments described herein can be implemented in an order other than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

What is claimed is:

1. A method for identifying a position of a sound source, the method comprising:
obtaining first location information based on echo data measured by a radar, wherein the first location information comprises a first angle of an object relative to the radar, the object associated with the sound source;

obtaining an incident angle based on a plurality of voice signals respectively captured by a plurality of microphones of a microphone array, the plurality of voice signals correspond to the sound source, wherein the incident angle is an angle at which the plurality of voice signals is incident on the microphone array; and fusing the first angle and the incident angle to obtain second location information, wherein the second location information indicates the position of the sound source, wherein fusing the first angle and the incident angle to obtain the second location information comprises:
- determining a first weight corresponding to the first angle and a second weight corresponding to the incident angle, wherein the first weight and a moving speed of the object relative to the radar are positively correlated, and
- performing weighted fusion on the first angle and the incident angle based on the first weight and the second weight to obtain a fused angle.

2. The method according to claim 1,
wherein the second weight and the moving speed of the object relative to the radar are negatively correlated; and
wherein the second location information comprises the fused angle.

3. The method according to claim 1, wherein the method further comprises:
extracting, based on the second location information, voice data of the sound source from the voice signals captured by the microphone array.

4. The method according to claim 3, wherein the extracting, based on the second location information, voice data of the sound source from the voice signals captured by the microphone array comprises:
using data captured by the microphone array as input data of a preset beam separation network, and outputting the voice data of the sound source.

5. The method according to claim 4, wherein the beam separation network comprises a voice separation model for separating the voice data of the sound source and background data in the input data, and the method further comprises:
determining a moving speed of the sound source based on the echo data; and
updating the voice separation model based on the moving speed to obtain an updated voice separation model.

6. The method according to claim 5, wherein the updating the voice separation model based on the moving speed comprises:
determining a parameter set of the voice separation model based on the moving speed, to obtain the updated voice separation model, wherein the parameter set is related to a change rate of a parameter of the voice separation model, and wherein the moving speed and the change rate are positively correlated.

7. The method according to claim 5, wherein the beam separation network further comprises a dereverberation model to filter out a reverberation signal in the input data, the method further comprising
updating, based on a distance between the object and the radar, the dereverberation model to obtain an updated dereverberation model.

8. The method according to claim 7, wherein the updating, based on the distance between the object and the radar, the dereverberation model comprises:
updating, based on the distance between the object and the radar, a delay parameter and a prediction order in the dereverberation model to obtain the updated dereverberation model, wherein the delay parameter indicates a duration of the reverberation signal lagging behind the voice data of the sound source, wherein the prediction order indicates a duration of reverberation, and wherein both the delay parameter and the prediction order are positively correlated with the distance.

9. The method according to claim 3, the method further comprising:
in response to the voice data of the sound source does not meet a preset condition, removing a beam used to process the data corresponding to the sound source in the data captured by the microphone array.

10. The method according to claim 3, the method further comprising:
extracting a feature from the voice data to obtain an acoustic feature of the sound source;
recognizing, based on the acoustic feature, a first probability that the sound source is a living object;
determining, based on the echo data of the radar, a second probability that the sound source is the living object; and
fusing the first probability and the second probability to obtain a fusion result indicating whether the sound source is the living object.

11. The method according to claim 1, wherein the obtaining the incident angle by using the voice signals captured by the microphone array comprises:
in response to a plurality of second angles being obtained by using the voice signals captured by the microphone array, and the first angle and the plurality of second angles are in a same coordinate system, selecting, a second angle from the plurality of second angles, wherein a difference between the second angle and the first angle is a smallest difference in a plurality of differences between the plurality of second angles and the first angle, or the difference falls within a first preset range; and
using the second angle as the incident angle.

12. The method according to claim 1, wherein after the obtaining the incident angle by using the voice signal captured by the microphone array, the method further comprising:
in response to a plurality of third angles are obtained based on data captured by the microphone array for another time, selecting, based on the moving speed of the object, a third angle from the plurality of third angles, and
using the third angle as a new incident angle.

13. The method according to claim 12, wherein the selecting, based on the moving speed of the object, the third angle from the plurality of third angles, and using the third angle as the new incident angle comprises:
in response to the moving speed of the object is greater than a preset speed, selecting, from the plurality of third angles, the third angle, wherein a difference between the third angle and the first angle falls within a second preset range, and
using the third angle as the new incident angle.

14. The method according to claim 13, wherein the selecting, based on the moving speed of the object, the third angle from the plurality of third angles, and using the third angle as the new incident angle comprises:
  in response to the moving speed of the object is not greater than the preset speed, selecting, from the plurality of third angles, the third angle, wherein a difference between the third angle and the first angle falls within a third preset range, wherein the third preset range is greater than the second preset range, and
  using the third angle as the new incident angle.

15. The method according to claim 1, wherein before the obtaining the incident angle by using the voice signal captured by the microphone array, the method further comprising:
  in response to it is determined, by using the echo data, that the object is in a moving state and the object does not make a sound, adjusting a sound source detection threshold of the microphone array for the object, wherein the microphone array is configured to capture a voice signal of which a sound pressure is higher than the sound source detection threshold.

16. The method according to claim 1, wherein the first location information further comprises a first relative distance between the object and the radar, the method further comprising:
  obtaining a second relative distance between the object and the microphone array by using the voice signal captured by the microphone array; and
  fusing the first relative distance and the second relative distance to obtain a fused distance, wherein the fused distance indicates a distance of the sound source relative to the microphone array, and wherein the second location information further comprises the fused distance.

17. A non-transitory computer readable medium, comprising a computer program, wherein when the computer program is run on an electronic device, the electronic device is enabled to perform:
  obtaining first location information by using echo data of a radar of the electronic device, wherein the first location information comprises a first angle of an object relative to the radar;
  obtaining an incident angle by using a voice signal captured by a microphone array of the electronic device, wherein the incident angle is an angle at which the voice signal is incident on the microphone array; and
  fusing the first angle and the incident angle to obtain second location information, wherein the second location information indicates a location of a sound source generating the voice signal, wherein fusing the first angle and the incident angle to obtain the second location information comprises:
    determining a first weight corresponding to the first angle and a second weight corresponding to the incident angle, wherein the first weight and a moving speed of the object relative to the radar are positively correlated, and
    performing weighted fusion on the first angle and the incident angle based on the first weight and the second weight to obtain a fused angle.

18. The non-transitory computer readable medium according to claim 17,
  wherein the second weight and the moving speed of the object relative to the radar are negatively correlated; and
  wherein the second location information comprises the fused angle.

19. A sound pickup apparatus, comprising:
  a radar configured to: transmit a modulated wave, and receive echo data,
  a microphone array comprising at least one microphone, wherein the microphone array is configured to capture a voice signal sent by a sound source, and
  a processor, wherein the radar, the microphone array, and the processor are connected;
  wherein the processor is configured to:
    obtain first location information by using echo data of the radar, wherein the first location information comprises a first angle of an object relative to the radar;
    obtain an incident angle by using a voice signal captured by the microphone array, wherein the incident angle is an angle at which the voice signal is incident on the microphone array; and
    fuse the first angle and the incident angle to obtain second location information, wherein the second location information indicates a location of a sound source generating the voice signal by:
      determining a first weight corresponding to the first angle and a second weight corresponding to the incident angle, wherein the first weight and a moving speed of the object relative to the radar are positively correlated, and
      performing weighted fusion on the first angle and the incident angle based on the first weight and the second weight to obtain a fused angle.

20. The sound pickup apparatus according to claim 19, wherein
  wherein the second weight and the moving speed of the object relative to the radar are negatively correlated; and
  wherein the second location information comprises the fused angle.

* * * * *

UNITED STATES PATENT AND TRADEMARK OFFICE
CERTIFICATE OF CORRECTION

PATENT NO. : 12,298,425 B2
APPLICATION NO. : 18/215486
DATED : May 13, 2025
INVENTOR(S) : Dongwen Ying et al.

Page 1 of 1

It is certified that error appears in the above-identified patent and that said Letters Patent is hereby corrected as shown below:

In the Claims

In Claim 20, Column 42, Line 45, delete "according to claim 19, wherein wherein the second weight" and insert -- according to claim 19, wherein the second weight --

Signed and Sealed this
Fifth Day of August, 2025

Coke Morgan Stewart
*Acting Director of the United States Patent and Trademark Office*